(12) United States Patent
Klimanis

(10) Patent No.: US 10,178,474 B2
(45) Date of Patent: Jan. 8, 2019

(54) SOUND SIGNATURE DATABASE FOR INITIALIZATION OF NOISE REDUCTION IN RECORDINGS

(71) Applicant: Google LLC, Mountain View, CA (US)

(72) Inventor: Gints Valdis Klimanis, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/692,581

(22) Filed: Apr. 21, 2015

(65) Prior Publication Data

US 2016/0316293 A1 Oct. 27, 2016

(51) Int. Cl.

| H04R 3/00 | (2006.01) |
|---|---|
| G10L 21/0208 | (2013.01) |
| G10L 25/54 | (2013.01) |
| H04L 12/28 | (2006.01) |
| G10L 25/48 | (2013.01) |
| H04R 1/02 | (2006.01) |
| G10L 21/02 | (2013.01) |

(52) U.S. Cl.
CPC ............ *H04R 3/00* (2013.01); *G10L 21/0208* (2013.01); *G10L 25/54* (2013.01); *H04L 12/2823* (2013.01); *G10K 2210/105* (2013.01); *G10L 21/0202* (2013.01); *G10L 25/48* (2013.01); *H04R 1/028* (2013.01); *H04R 2410/05* (2013.01)

(58) Field of Classification Search
CPC .... H03G 5/165; H04B 15/00; G10L 21/0202; G10L 19/00; G10L 21/0208; G10L 25/54; G10L 25/48; G10K 2210/105; G10K 2210/1054; H04R 1/028; H04R 3/00; H04R 2420/05; H04L 12/2823

USPC .... 381/71.1, 71.2, 71.3, 71.4, 103, 94.3, 56, 381/77; 704/233

See application file for complete search history.

(56) References Cited

U.S. PATENT DOCUMENTS

| 9,305,554 | B2 | 4/2016 | Jagatheesan et al. | |
|---|---|---|---|---|
| 2006/0281435 | A1* | 12/2006 | Shearer | G06K 19/0707 455/343.1 |
| 2009/0010460 | A1 | 1/2009 | Diedrichsen | |
| 2009/0016545 | A1* | 1/2009 | Stelliga | H04B 15/00 381/94.3 |

(Continued)

OTHER PUBLICATIONS

Walker, Martin, "Convolution Processing With Impulse Responses," "Sound on Sound", May 11, 2016, all pages. Retrieved from: http://www.soundonsound.com/sos/apr05/articles/impulse.htm.

(Continued)

*Primary Examiner* — Paul S Kim
*Assistant Examiner* — Ubachukwu Odunukwe
(74) *Attorney, Agent, or Firm* — Kilpatrick Townsend & Stockton LLP

(57) ABSTRACT

A smart-home device may include a recording device configured to record sound during a first time interval and a memory device comprising a plurality of stored sound profiles. The smart-home device may also include a processing system configured to receive an environmental input, select a stored sound profile from the plurality of stored sound profiles based on the environmental input, and perform a noise-cancelation routine on the sound recorded during the first time interval. The stored sound profile may be used as an initial background noise profile for the noise-cancelation routine.

17 Claims, 21 Drawing Sheets

(56) References Cited

U.S. PATENT DOCUMENTS

| | | | |
|---|---|---|---|
| 2014/0185828 A1* | 7/2014 | Helbling | H03G 5/165 |
| | | | 381/103 |
| 2014/0316778 A1* | 10/2014 | Venkatesha | G10L 21/0202 |
| | | | 704/233 |
| 2015/0043737 A1* | 2/2015 | Abe | G10L 25/48 |
| | | | 381/56 |
| 2015/0120294 A1 | 4/2015 | Gardner et al. | |
| 2015/0127340 A1 | 5/2015 | Epshteyn et al. | |
| 2015/0131810 A1* | 5/2015 | Kim | H04R 1/028 |
| | | | 381/77 |
| 2015/0212500 A1* | 7/2015 | Akabane | G05D 1/0274 |
| | | | 700/275 |
| 2015/0283702 A1 | 10/2015 | Izhikevich et al. | |

OTHER PUBLICATIONS

U.S. Appl. No. 14/692,551, filed Apr. 21, 2015, Final Office Action dated May 31, 2017, all pages.

* cited by examiner

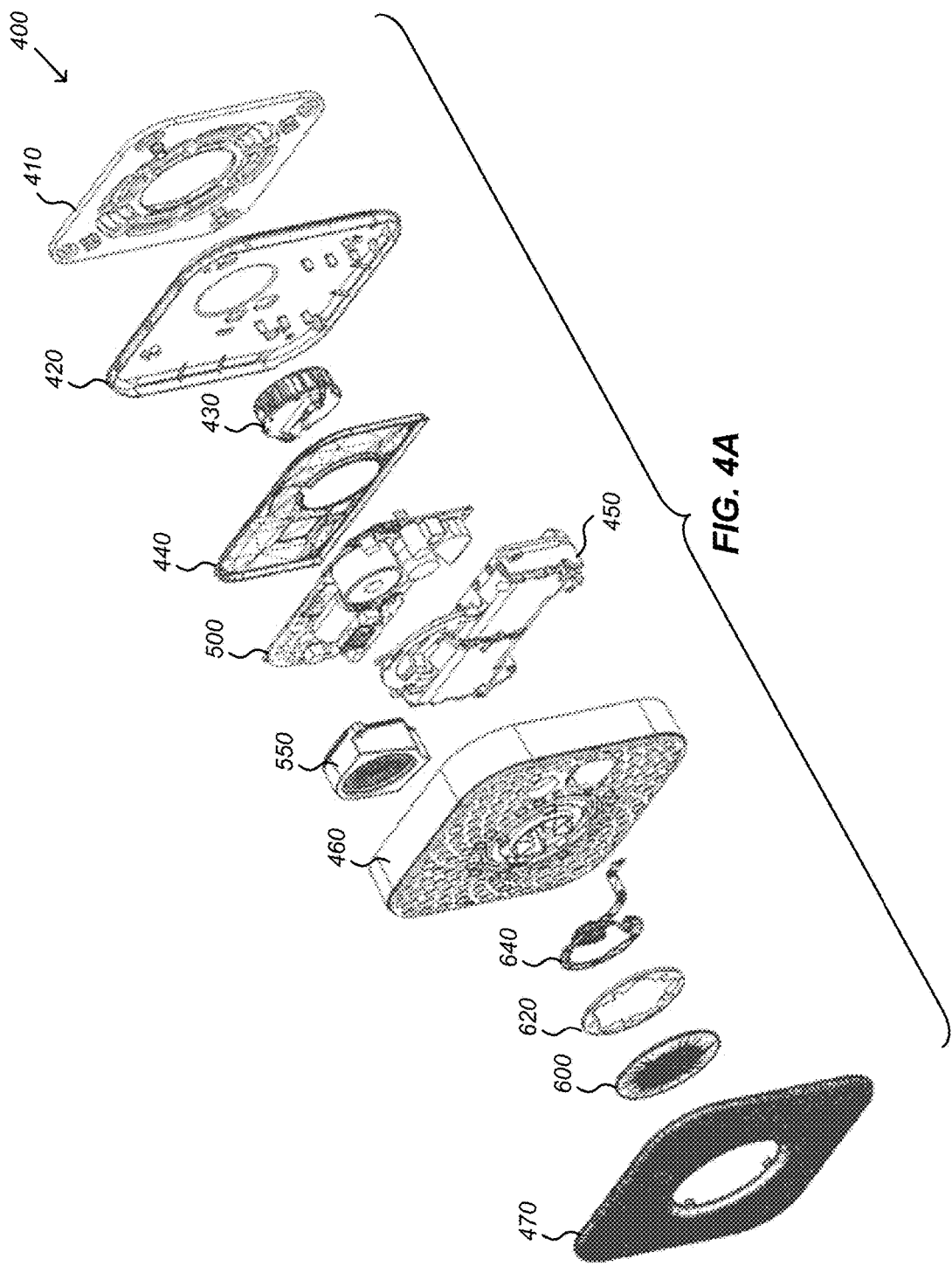

SOUND SIGNATURE DATABASE FOR INITIALIZATION OF NOISE REDUCTION IN RECORDINGS

CROSS-REFERENCES TO RELATED APPLICATIONS

The subject matter of the instant disclosure is related to the subject matter of the following commonly assigned applications, each of which is incorporated by reference herein for all purposes: U.S. Ser. No. 14/692,551 filed on Apr. 21, 2015, entitled "CUSTOMIZING SPEECH-RECOGNITION DICTIONARIES IN A SMART-HOME ENVIRONMENT."

BACKGROUND OF THE INVENTION

Some homes today are equipped with smart home networks to provide automated control of devices, appliances and systems, such as heating, ventilation, and air conditioning ("HVAC") systems, lighting systems, alarm systems, and home theater and entertainment systems. Smart home networks may include control panels that a person may use to input settings, preferences, and scheduling information that the smart home network uses to provide automated control the various devices, appliances and systems in the home.

BRIEF SUMMARY OF THE INVENTION

In some embodiments, a smart-home device may include a recording device configured to record sound during a first time interval, and a memory device that includes a plurality of stored sound profiles. The smart-home device may also include a processing system configured to receive an environmental input, select a stored sound profile from the plurality of stored sound profiles based on the environmental input, and perform a noise-cancelation routine on the sound recorded during the first time interval. In some embodiments, the stored sound profile may be used as an initial background noise profile for the noise-cancelation routine.

In some embodiments, a method of selecting an initial background noise for a noise-cancelation routine in a smart-home device may include receiving, by the smart-home device, an environmental input. The method may also include selecting, using a processor on the smart-home device, a stored sound profile from a plurality of stored sound profiles. In some embodiments, the stored sound profile may be selected based on the environmental input. The method may additionally include performing the noise-cancelation routine on sound received through a microphone of the smart-home device. In some embodiments, the noise-cancelation routine may be performed using the stored sound profile as an initial background noise for the noise-cancelation routine.

In some embodiments, a non-transitory memory device may be presented. The memory device may include instructions that, when executed by one or more processors, cause the one or more processors to perform operations including receiving, by the one or more processors, an environmental input. The operations may also include selecting, using the one or more processors, a stored sound profile from a plurality of stored sound profiles. In some embodiments, the stored sound profile may be selected based on the environmental input. The operations may additionally include performing the noise-cancelation routine on a received sound. In some embodiments, the noise-cancelation routine may be performed using the stored sound profile as an initial background noise for the noise-cancelation routine.

In various implementations, one or more of the following features may be incorporated in any combination and without limitation. The smart-home device may include a hazard detector that includes a smoke detector and a carbon monoxide detector. The smart-home device may include a thermostat that includes a temperature sensor; and a motion sensor. The smart-home device may include a network interface in communication with a remote server. The processing system may be further configured to: receive a second environmental input; send the second environmental input to a remote server through the network interface; receive a second stored sound profile through the network interface from the remote server, where the remote server selected the second stored sound profile based on the second environmental input; and perform the noise-cancellation routine on sound recorded during a second time interval, where the second stored sound profile is used as an initial background noise profile for the noise-cancellation routine. The processing system may be further configured to: record a new sound profile using the microphone; and send the new sound profile to the remote server through the network interface. The smart-home device may be in communication through the network interface with an appliance within the same home; and the environmental input may be received from the appliance. The stored sound profile may be recorded by a second smart-home device within the same home and transmitted from the second smart-home device to the smart-home device. The environmental input may include a time of day. The environmental input may include a sound recording. The environmental input may include an input received from a household appliance. The sound received through the microphone of the smart-home device may have a duration of less than approximately 10 seconds. The noise-cancellation routine may use the initial background noise as a starting point for a convergence algorithm. The method/operations may also include determining that a second stored sound profile will cause the convergence algorithm to converge faster than the stored sound profile; and providing the second stored sound profile to the noise-cancellation routine. The method/operations may additionally include during a learning interval, building the plurality of stored sound profiles by detecting a time interval during which a study-state background noise is present; recording the steady-state background noise; and recording characteristics of the occurrence of the study-state background noise. The stored sound profile may be associated with sound emitted by a household appliance during operation. The received sound may include a voice command. The noise-cancellation routine may be performed on the received sound in real-time.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIGS. 4A-4B illustrate perspective exploded and assembled views, respectively, of an intelligent, multi-sensing, network-connected hazard detector, according to some embodiments.

DETAILED DESCRIPTION OF THE INVENTION

Figure 1:
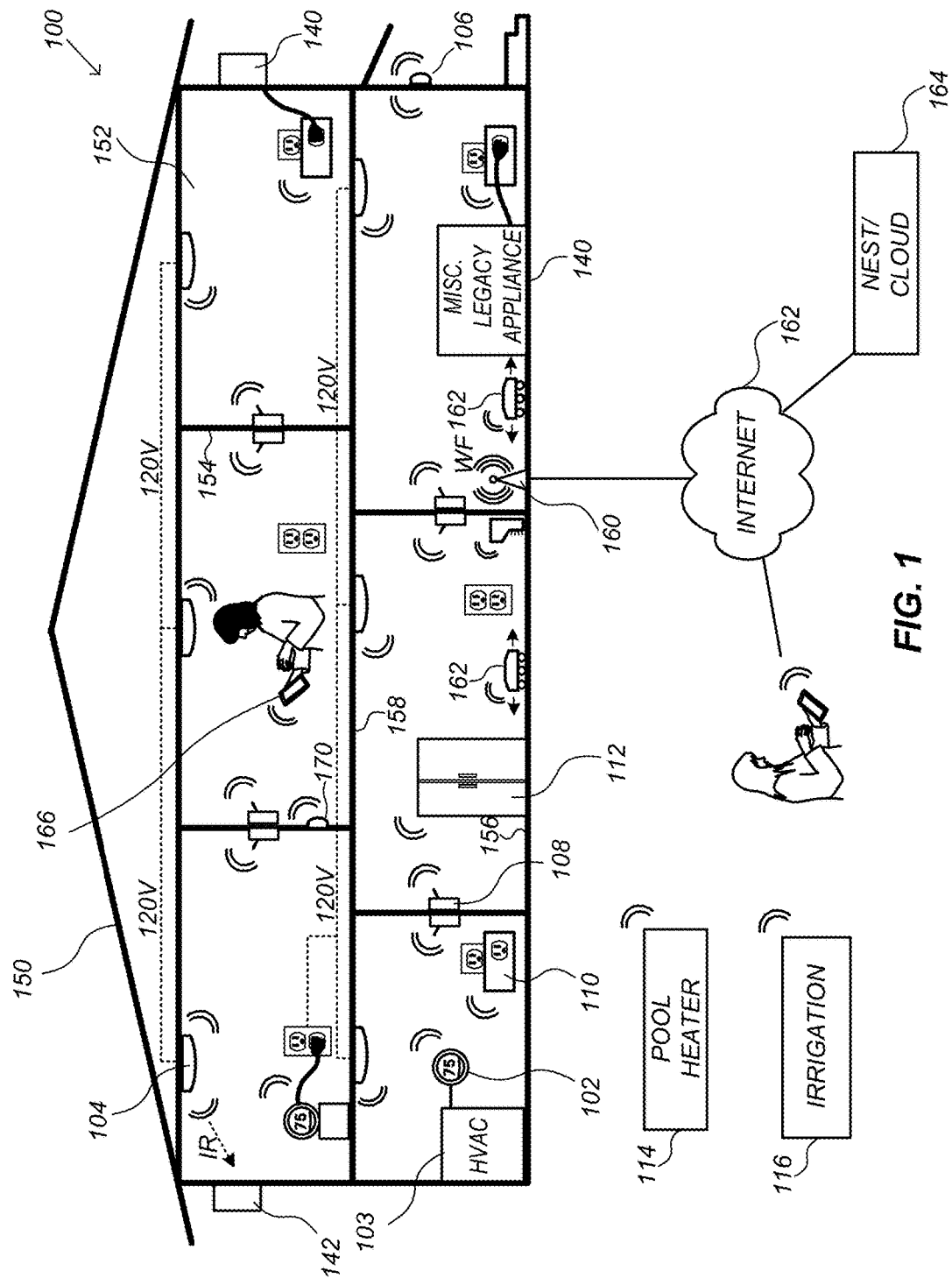
FIG. 1 is an example of a smart-home environment within which one or more of the devices, methods, systems, services, and/or computer program products described further herein will be applicable, according to some embodiments.

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

Provided according to one or more embodiments are methods and systems for setting up, pairing, controlling, and/or programming one or more of intelligent, network-connected, multi-sensing hazard detection units or smart hazard detectors. These smart hazard detectors may be configured and adapted to be implemented in a smart home environment, seamlessly interacting with other devices in the smart home environment. The term "smart hazard detector" is used herein to represent a particular type of device that can be used for detecting hazards occurring within a structure, e.g., a home, an office or another structure. However, this smart hazard detector may also be capable of controlling other devices, detecting non-hazard related events (e.g., security related events), and/or working in cooperation with other devices to provide additional features to the smart home environment. Again, it is within the scope of the present teachings for embodiments of the smart hazard detectors of the present invention to detect measurable characteristics other than hazards (e.g., pressure, flow rate, height, position, velocity, acceleration, capacity, power, loudness, and brightness) and monitor and/or respond to one or more measurable characteristics of one or more physical systems.

It is to be appreciated that "smart home environments" may refer to smart environments for homes such as a single-family house, but the scope of the present teachings is not so limited, the present teachings being likewise applicable, without limitation, to duplexes, townhomes, multi-unit apartment buildings, hotels, retail stores, office buildings, industrial buildings, and more generally any living space or work space having one or more smart hazard detectors.

It is to be further appreciated that while the terms user, customer, installer, homeowner, occupant, guest, tenant, landlord, repair person, and the like may be used to refer to the person or persons who are interacting with the smart hazard detector or user interface in the context of some particularly advantageous situations described herein, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the embodiments—for example, the password-protected hazard detection functionality described further herein may be particularly advantageous where the landlord holds the sole password and can control hazard detection via the hazard detection device—such identity should not be construed in the descriptions that follow as necessarily limiting the scope of the present teachings to those particular individuals having those particular identities.

Overview of Smart Hazard Detector Capabilities

Turning to the figures, FIG. 1 illustrates an example of a smart-home environment 100 within which one or more of the devices, methods, systems, services, and/or computer program products described further herein can be applicable. The depicted smart-home environment 100 includes a structure 150, which can include, e.g., a house, office building, garage, or mobile home. It will be appreciated that devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes a plurality of devices, including intelligent, multi-sensing, network-connected devices, that can integrate seamlessly with each other and/or with a central server or a cloud-computing system to provide any of a variety of useful smart-home objectives. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 104"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupants go and come).

In some embodiments, the smart-home environment 100 of FIG. 1 further includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Still further, in some embodiments, the smart-home environment 100 of FIG. 1 includes a plurality of intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 112 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, the smart thermostats 102, the smart hazard detectors 104, the smart doorbells 106, the smart wall switches 108, the smart wall plugs 110, and other devices of the smart-home environment 100 are modular and can be incorporated into older and new houses. For example, the devices are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information is then used to obtain data helpful for determining optimal times for watering, such data may include sun location information, temperature, due point, soil type of the land on which the home is located, etc.

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone) 166. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some examples, some or all of the occupants (e.g., individuals who live in the home) can register their device 166 with the smart-home environment 100. Such registration can be made at a central server to authenticate the occupant and/or the device as being associated with the home and to give permission to the occupant to use the device to control the smart devices in the home. An occupant can use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 makes inferences about which individuals live in the home and are therefore occupants and which devices 166 are associated with those individuals. As such, the smart-home environment "learns" who is an occupant and permits the devices 166 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 100. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" the thermostat, especially at night while the home is dark and others are sleeping. Further, the guest may not want to go through the hassle of downloading the necessary application to their device for remotely controlling the thermostat. In fact, the guest may not have the home owner's login credentials, etc., and therefore cannot remotely control the thermostat via such an application. Accordingly, according to embodiments of the invention, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web App (LWA) on the smart device. Business owners will likely say no; home owners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 166. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques descripted in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 102, 104, 106, 108, 110, 112, 114, and 116 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.)

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

According to embodiments, the smart devices combine to create a mesh network of spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and can only communicate using wireless protocols that requires very little power, such as Zigbee, 6LoWPAN, etc. Further, some, but not all, low-power nodes are incapable of bidirectional communication. These low-power nodes send messages, but they are unable to "listen". Thus, other devices in the smart-home environment 100, such as the spokesman nodes, cannot send information to these low-power nodes.

As described, the smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able send messages across the entire smart-home environment 100 as well as over the Internet 162 to the central server or cloud-computing system 164. According to embodiments, the mesh network enables the central server or cloud-computing system 164 regularly receive data from all of the smart devices in the home, make inferences based on the data, and send commands back to one of the smart devices to accomplish some of the smart-home objectives descried herein.

As described, the spokesman nodes and some of the low-powered nodes are capable of "listening". Accordingly, users, other devices, and the central server or cloud-computing system 164 can communicate controls to the low-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

An example of a low-power node is a smart nightlight 170. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of low-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 106, 108, 110, 112, and 170) can function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is armed at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 100. For example, for each room in the house, the user provides a map of the best exit route. It should be appreciated that instead of a user providing this information, the central server or cloud-computing system 164 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Further included and illustrated in the exemplary smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 162 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 162 is configured to move itself into the immediate presence (e.g., within five feet) of a particular occupant who has settled into a particular location in the home (e.g. in the dining room to eat their breakfast and read the news). The localized-thermostat service robot 162 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 162 proceeds to move and park itself next to the couch and keep that particular immediate space at a comfortable temperature.

Technologies by which the localized-thermostat service robot 162 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 162 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 162 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 162, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 162 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 162 can be advised by other smart-home sensors that the temperature and humidity levels are rising in the kitchen, which is nearby to the occupant's current dining room location, and responsive to this advisory the hazard detector service robot 162 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 162 having respective dedicated ones of such functionalities, by a single service robot 162 having an integration of two or more different ones of such functionalities, and/or any combinations thereof (including the ability for a single service robot 162 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 162 will automatically dock and recharge its batteries (if needed) during periods of inactivity. Preferably, each service robot 162 includes wireless communication components that facilitate data communications with one or more of the other wirelessly communicating smart-home sensors of FIG. 1 and/or with one or more other service robots 162 (e.g., using Wi-Fi, Zigbee, Z-Wave, 6LoWPAN, etc.), and one or more of the smart-home devices of FIG. 1 can be in communication with a remote server over the Internet. Alternatively or in conjunction therewith, each service robot 162 can be configured to communicate directly with a remote server by virtue of cellular telephone communications, satellite communications, 3G/4G network data communications, or other direct communication method.

Provided according to some embodiments are systems and methods relating to the integration of the service robot(s) 162 with home security sensors and related functionalities of the smart home system. The embodiments are particularly applicable and advantageous when applied for those service robots 162 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 100 that happens to be closest to the occupant when the occupant falls asleep will be the device that transmits messages regarding when the occupant stopped moving, from which the central server or cloud-computing system 164 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 102 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 164 are used to detect or monitor the progress of Alzheimer's Disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

Figure 2:
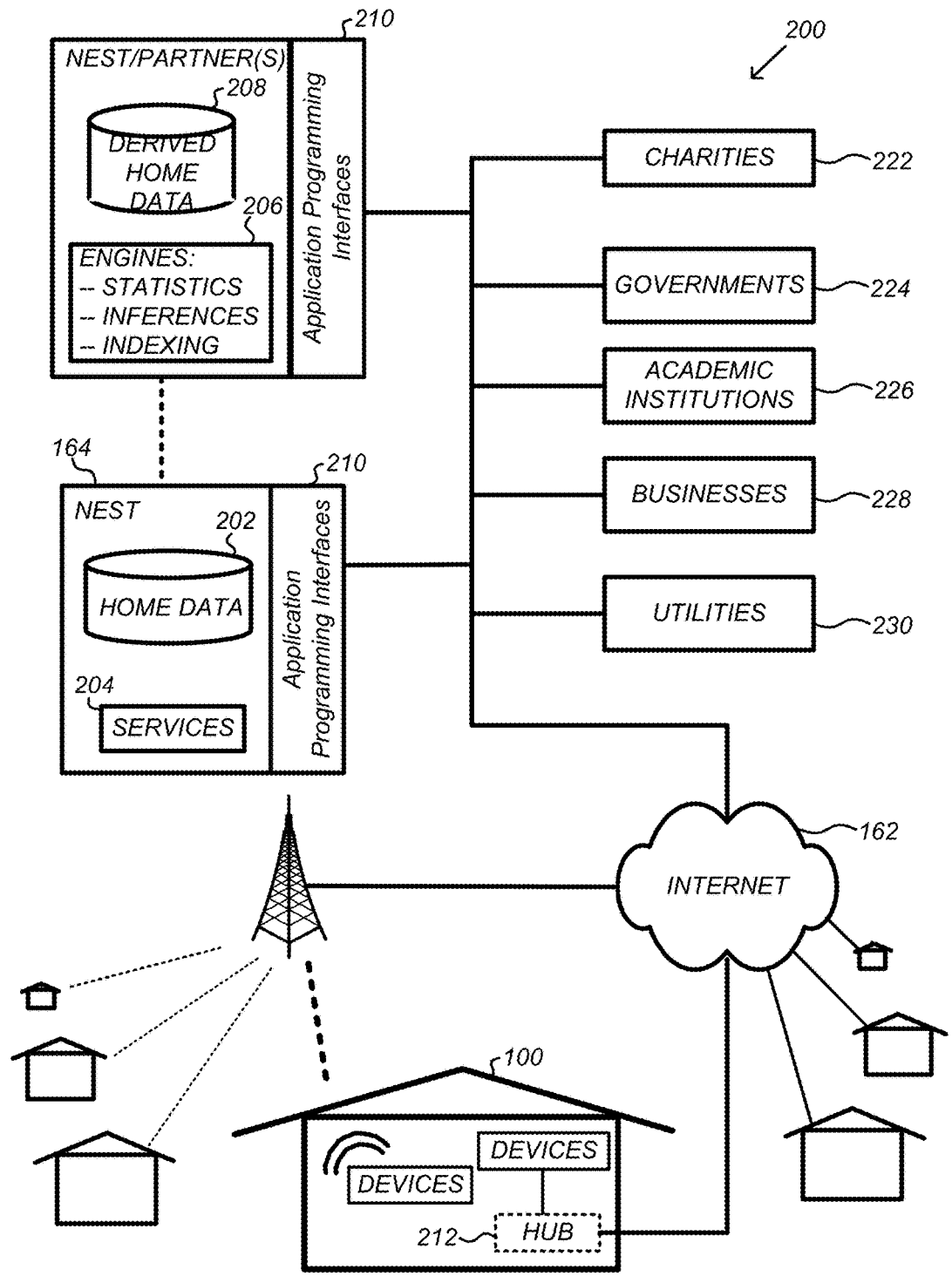
FIG. 2 illustrates a network-level view of an extensible devices and services platform with which the smart-home environment of FIG. 1 can be integrated, according to some embodiments.

FIG. 2 illustrates a network-level view of an extensible devices and services platform 200 with which a plurality of smart-home environments, such as the smart-home environment 100 of FIG. 1, can be integrated. The extensible devices and services platform 200 includes remote servers or cloud computing architectures 164. Each of the intelligent, network-connected devices 102, 104, 106, 108, 110, 112, 114, and 116 from FIG. 1 (identified simply as "smart devices" in FIGS. 2-3 herein) can communicate with the remote servers or cloud computing architectures 164. For example, a connection to the Internet 162 can be established either directly (for example, using 3G/4G connectivity to a wireless carrier), through a hubbed network 212 (which can be a scheme ranging from a simple wireless router, for example, up to and including an intelligent, dedicated whole-home control node), or through any combination thereof.

Although in some examples provided herein, the devices and services platform 200 communicates with and collects data from the smart devices of smart-home environment 100 of FIG. 1, it should be appreciated that the devices and services platform 200 communicates with and collects data from a plurality of smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 routinely collects data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection/logging, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving a request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about device usage across a population of devices and send the statistics to device users, service providers or other entities (e.g., that have requested or may have provided monetary compensation for the statistics).

According to some embodiments, the home data 202, the derived home data 208, and/or another data can be used to create "automated neighborhood safety networks." For example, in the event the central server or cloud-computing architecture 164 receives data indicating that a particular home has been broken into, is experiencing a fire, or some other type of emergency event, an alarm is sent to other smart homes in the "neighborhood." In some instances, the central server or cloud-computing architecture 164 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 164 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can run programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirms that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 200 expose a range of application programming interfaces (APIs) 210 to third parties, such as charities 222, governmental entities 224 (e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and other third parties. The APIs 210 are coupled to and permit third-party systems to communicate with the central server or the cloud-computing system 164, including the services 204, the processing engine 206, the home data 202, and the derived home data 208. For example, the APIs 210 allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps, that integrate with the central server or the cloud-computing system 164 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 202 and the derived home data 208, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 3:
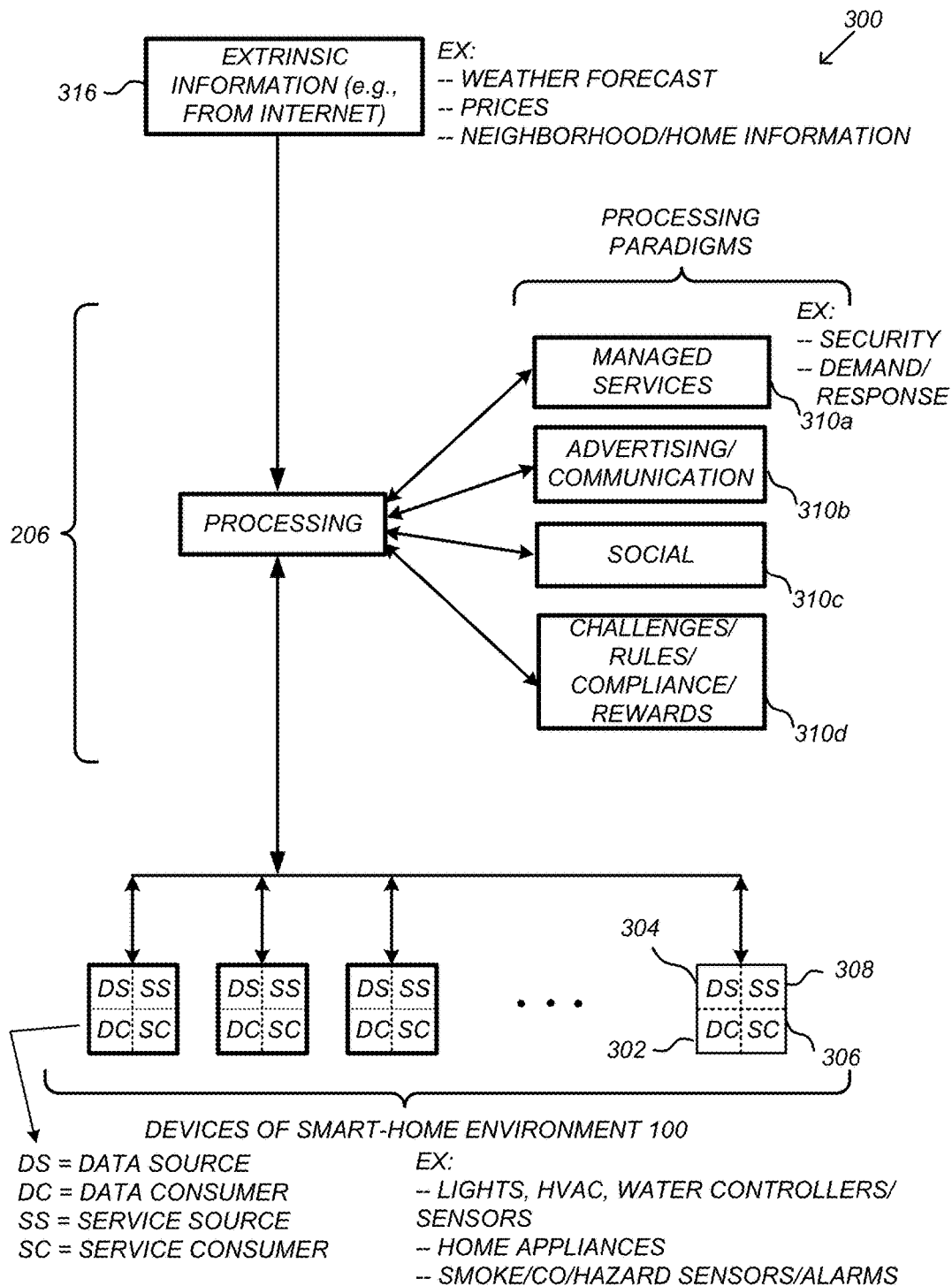
FIG. 3 illustrates an abstracted functional view of the extensible devices and services platform of FIG. 2, with reference to a processing engine as well as devices of the smart-home environment, according to some embodiments.

FIG. 3 illustrates an abstracted functional view of the extensible devices and services platform 200 of FIG. 2, with particular reference to the processing engine 206 as well as devices, such as those of the smart-home environment 100 of FIG. 1. Even though devices situated in smart-home environments will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

The processing engine 206 can include a challenges/rules/compliance/rewards paradigm 310*d* that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 206 can integrate or otherwise utilize extrinsic information 316 from extrinsic sources to improve the functioning of one or more processing paradigms. Extrinsic information 316 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Figure 4B:
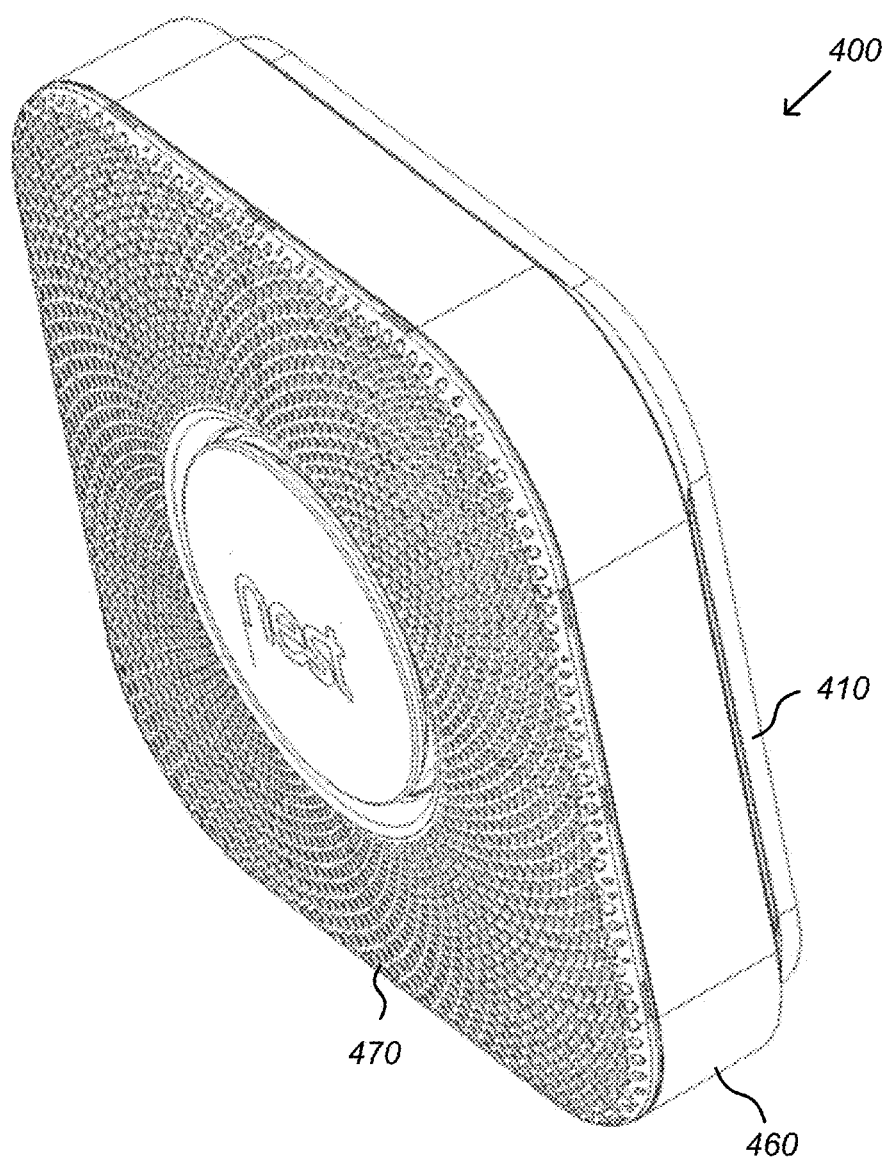

Referring now to FIG. 4A and FIG. 4B, illustrated is a hazard detector 400 that may be used as part of a smart home environment 100 as previously described. FIG. 4A illustrates an exploded perspective view of the hazard detector 400, while FIG. 4B illustrates an assembled view of the same hazard detector 400. In one embodiment, hazard detector 400 is a smoke detector that is configured to detect the presence of smoke and sound an alarm to audibly warn an occupant or occupants of the home or structure of a potential fire or other danger. In other embodiments, hazard detector 400 may be a carbon monoxide detector, heat detector, and the like. In one embodiment, hazard detector 400 is a multi-sensing detector that includes a smoke detector, carbon monoxide detector, heat detector, motion detector, and the like. Many of the present teachings are particularly advantageous for embodiments in which the hazard detector 400 is a multi-sensing detector, particularly since combining the various sensing modes together into a single device can pose substantial challenges with respect to one or more of device compactness, component powering, and overall component governance and coordination.

For convenience in describing the embodiments herein, the device 400 will be referred to hereinbelow as smart hazard detector or hazard detector 400, although it should be realized that hazard detector 400 may include various other devices and that the scope of the present teachings is not necessarily limited to hazard detectors in which smoke is required as one of the anomalies to be detected. Thus, for example, depending on the particular context as would be apparent to a person skilled in the art upon reading the instant disclosure, one or more of the advantageous features and embodiments described herein may be readily applicable to a multifunctional hazard sensor that detects carbon monoxide and motion only, or pollen and motion only, or noise pollution and pollen only, and so forth. Nevertheless, the combining of smoke detection functionality with other sensing functions does bring about one or more particularly problematic issues that are addressed by one or more of the present teachings.

In one embodiment, hazard detector 400 is a roughly square or rectangular shaped object having a width of approximately 120 to 134 mm and a thickness of approximately 38 mm. Stated differently, hazard detector 400 is a multi-sensing unit having a fairly compact shape and size that may be easily attached to a wall or ceiling of a home or structure so as to be able, among other functionalities, to detect the presence of smoke and alert an occupant therein of the potential fire danger. As shown in FIG. 4A, hazard detector 400 includes a mounting plate 410 that may be attached to a wall of the building or structure to secure the hazard detector 400 thereto. Hazard detector 400 also includes a back plate 420 that may be mounted to the mounting plate 410 and a front casing 460 that may be coupled with or otherwise secured to back plate 420 to define a housing having an interior region within which components of the hazard detector 400 are contained. A circuit board 500 may be coupled with or attached to back plate 420. Various components may be mounted on circuit board 500. For example, a smoke chamber 430 may be coupled with or mounted on circuit board 500 and configured to detect the presence of smoke. In one embodiment, smoke chamber 430 may be mid-mounted relative to circuit board 500 so that air may flow into smoke chamber 430 from a position above circuit board 500 and below circuit board

500. A speaker 550 and alarm device (not numbered) may also be mounted on circuit board 500 to audibly warn an occupant of a potential fire danger when the presence of smoke is detected via smoke chamber 430. Other components, such as a motion sensor, carbon monoxide sensor, microprocessor, and the like may likewise be mounted on circuit board 500 as described herein.

In one embodiment, a protective plate 440 may be attached to or otherwise coupled with circuit board 500 to provide a visually pleasing appearance to the inner components of hazard detector 400 and/or to funnel or direct airflow to smoke chamber 430. For example, when a user views the internal components of hazard detector 400, such as through vents in back plate 420, protective plate 440 may provide the appearance of a relatively smooth surface and otherwise hide the components or circuitry of circuit board 500. Protective plate 440 may likewise function to direct a flow of air from the vents of back plate 420 toward smoke chamber 430 so as to facilitate air flow into and out of smoke chamber 430.

Hazard detector 400 may also include a battery pack 450 that is configured to provide power to the various components of hazard detector 400 when hazard detector 400 is not coupled with an external power source, such as a 120 V power source of the home or structure. In some embodiments, a cover plate 470 may be coupled with the front casing 460 to provide a visually pleasing appearance to hazard detector 400 and/or for other functional purposes. In a specific embodiment, cover plate 470 may include a plurality of holes or openings that allow one or more sensors coupled with circuit board 500 to view or see through a surface of cover plate 470 so as to sense objects external to hazard detector 400. The plurality of openings of cover plate 470 may be arranged to provide a visually pleasing appearance when viewed by occupants of the home or structure. In one embodiment, the plurality of openings of cover plate 470 may be arranged according to a repeating pattern, such as a Fibonacci or other sequence.

A lens button 600 may be coupled with or otherwise mounted to cover plate 470. Lens button 600 may allow one or more sensors to view through the lens button 600 for various purposes. For example, in one embodiment a passive IR sensor (not shown) may be positioned behind the lens button 600 and configured to view through the lens button 600 to detect the presence of an occupant or occupants within the home or structure. In some embodiments, lens button 600 may also function as a button that is pressable by a user to input various commands to hazard detector 400, such as to shut off an alarm that is triggered in response to a false or otherwise harmless condition. Positioned distally behind lens button 600 may be a light ring 620 that is configured to receive light, such as from an LED or another light emitting element, and disperse the light within ring 620 to provide a desired visual appearance, such as a halo behind lens button 600. Positioned distally behind light ring 620 may be a flexible circuit board 640 that includes one or more electrical components, such as a passive IR sensor (hereinafter PIR sensor), LEDs, and the like. Flexible circuit board 640 (hereinafter flex ring 640) may be electrically coupled with circuit board 500 to communicate and/or receive instructions from one or more microprocessors mounted on a circuit board (not shown) during operation of hazard detector 400. Additional details of the components of hazard detector 400 are described in FIGS. 5A-D and 6A-F.

FIG. 4B illustrates hazard detector 400 with the various components assembled. Specifically, this figure shows the mounting plate 410, front casing 460, back plate 420, and cover plate 470 in an assembled configuration with the various other components contained within an interior space of hazard detector 400. This figure also shows the plurality of holes or openings of cover plate 470 forming a visually pleasing design that is viewable by occupant of a room within which the hazard detector 400 is mounted. The lens button 600 is shown attached to the hazard detector 400 so as to be centrally positioned with respect to cover plate 470. As briefly described, light ring 620 may be used to provide a halo appearance of light around and behind lens button 600. The assembled hazard detector 400 provides a compact yet multifunctional device.

Figure 5A:
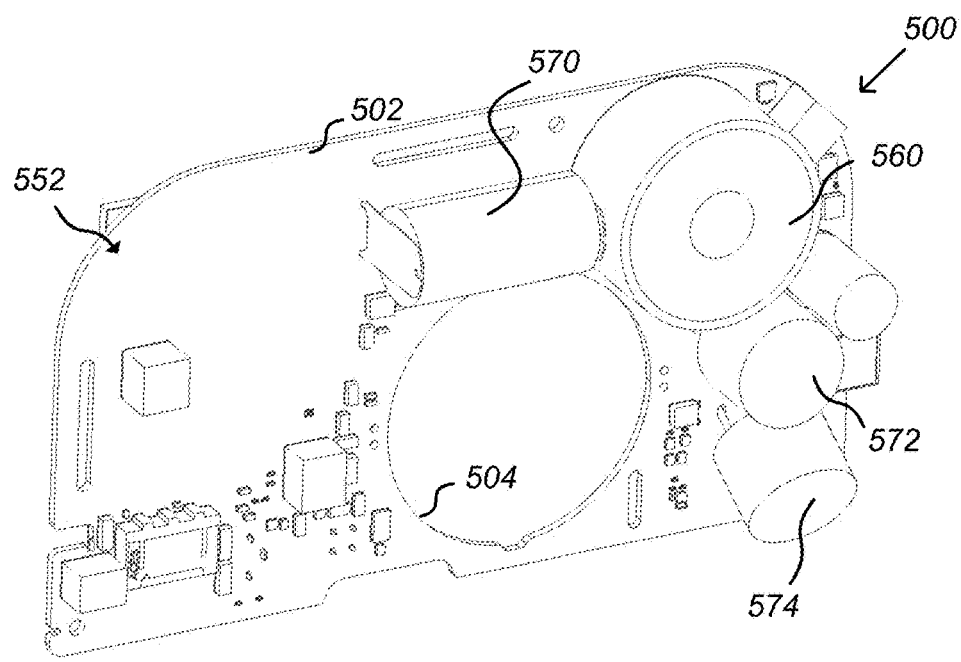
FIGS. 5A-5B illustrate front and rear perspective views of a circuit board of the hazard detector of FIGS. 4A-4B, according to some embodiments.
Figure 5B:
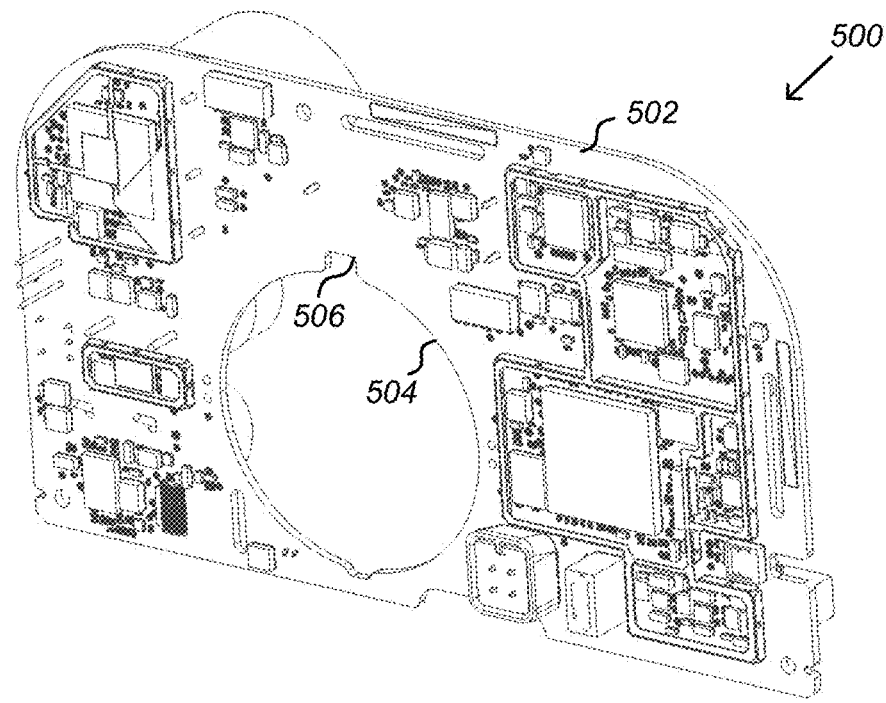

Referring now to FIG. 5A and FIG. 5B, illustrated are front and rear perspective views of circuit board 500. Circuit board 500 includes a main body 502 having a front side or surface and a rear side or surface. As described herein, various electrical components are mounted on circuit board 500. In some embodiments, these components may be mounted on the front surface of circuit board 500, on the rear surface of circuit board 500 opposite the front surface, or on both surfaces of the circuit board 500. For example, in a specific embodiment one or more microprocessors and/or other processor related components may be mounted on the rear surface of circuit board 500 facing protective plate 440 while one or more functional components (e.g. an alarm device, CO detector, speaker, motion sensors, Wi-Fi device, Zigbee device, and the like) are mounted on a front surface of circuit board 500 facing a room of the home or structure in which the hazard detector 400 is positioned. Other components may be mid-mounted relative to circuit board 500 so that opposing surfaces are positioned on opposing sides of the circuit board 500 as described herein.

As shown in FIG. 5A, in a specific embodiment the front surface of circuit board 500 may include a CO detector 570 that is configured to detect the presence of carbon monoxide gas and trigger an alarm device 560 if the carbon monoxide gas levels are determined to be too high. The alarm device 560 (which can be a piezoelectric buzzer having an intentionally shrill or jarring sound) may likewise be mounted on the front surface of circuit board 500 so as to face an occupant of the room in which the hazard detector 400 is positioned to alarm the occupant of a potential danger. Alarm device 560 may be configured to produce one or more sounds or signals to alert the occupant of the potential danger. The front surface may further include an area 552 in which a speaker 550 is positioned. Speaker 550 may be configured to provide audible warnings or messages to the occupant of the room. For example, speaker 550 may alert the occupant of a potential danger and instruct the occupant to exit the room. In some embodiments, speaker 550 may provide specific instructions to the occupant, such as an exit route to use when exiting the room and/or home or structure. Other messages may likewise be communicated to the occupant, such as to alert the occupant that the batteries are low, that CO levels are relatively high in the room, that hazard detector 400 needs periodic cleaning, or alert the occupant of any other abnormalities or issues related to hazard detector 400 or components thereof.

Circuit board 500 may also include one or more motion sensors mounted on the front surface thereof. The motion sensors may be used to determine the presence of an individual within a room or surrounding area of hazard detector 400. This information may be used to change the functionality of hazard detector 400 and/or one or more other devices connected in a common network as described previously. For example, this information may be relayed to a smart thermostat to inform the thermostat that occupants of the home or structure are present so that the smart thermostat may condition the home or structure according to one or more learned or programmed settings. Hazard detector 400 may likewise use this information for one or more purposes, such as to quiet the alarm device (e.g. gesture hush) as described herein or for various other reasons.

In one embodiment, a first ultrasonic sensor 572 and a second ultrasonic sensor 574 may be mounted on the front surface of circuit board 500. The two ultrasonic sensors, 572 and 574, may be offset axially so as to point in slightly different directions. In this orientation, each ultrasonic sensor may be used to detect the motion of an individual based on an orientation of the hazard detector 400 relative to the room and/or occupant. Detecting the motion of the individual may be used to quiet the alarm device as described herein (i.e., gesture hush) or for any other reason. In one embodiment, an axis of the first ultrasonic sensor 572 may be oriented substantially outward relative to hazard detector 400 while an axis of the second ultrasonic sensor 574 is oriented at an angle relative to the axis of first ultrasonic sensor 572. The first ultrasonic sensor 572 may sense motion of an individual when the hazard detector 400 is mounted on a ceiling of the home or structure. Because the first ultrasonic sensor 572 is oriented substantially outward relative to hazard detector 400, the first ultrasonic sensor 572 essentially looks straight down on individuals beneath hazard detector 400. The second ultrasonic sensor 574 may similarly sense motion of the individual when the hazard detector 400 is mounted on a wall of the home or structure. Because the second ultrasonic sensor 574 is oriented at an angle relative to the first ultrasonic sensor 572 and hazard detector 400, the second ultrasonic sensor essentially looks downward toward the floor when the hazard detector 400 is mounted on a wall of the home or structure, rather than looking directly outward as first ultrasonic sensor 572. In one embodiment, the angular offset of the two ultrasonic sensors may be approximately 30° or any other desired value.

In another embodiment, the two ultrasonic sensors, 572 and 574, may be replaced by a single ultrasonic sensor that is configured to rotate within hazard detector 400 so that the single ultrasonic sensor is capable of looking straight outward similar to first ultrasonic sensor 572 or capable of looking downward similar to second ultrasonic sensor 574. The single ultrasonic sensor may be coupled to circuit board 500 via a hinge that allows the ultrasonic sensor to rotate based on the orientation of hazard detector 400. For example, when hazard detector 400 is mounted to a ceiling of the home or structure, gravity may orient the ultrasonic sensor so as to look straight downward; whereas when hazard detector 400 is coupled to a wall of the home or structure, gravity may cause the ultrasonic sensor to rotate via the hinge and look downward toward a floor and relative to hazard detector 400. In another embodiment, a motor may be coupled with the single ultrasonic sensor so as to rotate the ultrasonic sensor based on the orientation of hazard detector 400. In this manner, the ultrasonic sensor may always point in a direction that is likely to detect motion of an individual within the room or space surrounding the hazard detector 400. In yet another embodiment, the single ultrasonic sensor may have a wide field of view that is able to substantially accommodate both mounting positions of the two ultrasonic sensors 572 and 574.

As shown in FIGS. 5A and 5B, body 502 of circuit board 500 also includes a substantially centrally located aperture 504 through which smoke chamber 430 is inserted so as to mid-mount the smoke chamber 430 relative to circuit board 500. Aperture 504 may also include a pair of notches 506 through which wires are inserted to electrically couple the smoke chamber 430 with circuit board 500. As previously described, mid-mounting of the smoke chamber 430 through an aperture 504 allows smoke and air to enter smoke chamber 430 from both the front surface or side of circuit board 500 and the rear surface or side of circuit board 500. Various aspects of the electrical components on the circuit board 500 are now described, the positions thereon of many of which will be apparent to the skilled reader in view of the descriptions herein and FIGS. 5A-5B. Included on the circuit board 500 can be several components, including a system processor, relatively high-power wireless communications circuitry and antenna, relatively low-power wireless communications circuitry and antenna, non-volatile memory, audio speaker 550, one or more interface sensors, a safety processor, safety sensors, alarm device 560, a power source, and powering circuitry. The components are operative to provide failsafe safety detection features and user interface features using circuit topology and power budgeting methods that minimize power consumption. According to one preferred embodiment, a bifurcated or hybrid processor circuit topology is used for handling the various features of the hazard detector 400, wherein the safety processor is a relatively small, relatively lean processor that is dedicated to core safety sensor governance and core alarming functionality as would be provided on a conventional smoke/CO alarm, and wherein the system processor is a relatively larger, relatively higher-powered processor that is dedicated to more advanced features such as cloud communications, user interface features, occupancy and other advanced environmental tracking features, and more generally any other task that would not be considered a "core" or "conventional" safety sensing and alarming task.

By way of example and not by way of limitation, the safety processor may be a Freescale KL15 microcontroller, while the system processor may be a Freescale K60 microcontroller. Preferably, the safety processor is programmed and configured such that it is capable of operating and performing its core safety-related duties regardless of the status or state of the system processor. Thus, for example, even if the system processor is not available or is otherwise incapable of performing any functions, the safety processor will continue to perform its core safety-related tasks such that the hazard detector 400 still meets all industry and/or government safety standards that are required for the smoke, CO, and/or other safety-related monitoring for which the hazard detector 400 is offered (provided, of course, that there is sufficient electrical power available for the safety processor to operate). The system processor, on the other hand, performs what might be called "optional" or "advanced" functions that are overlaid onto the functionality of the safety processor, where "optional" or "advanced" refers to tasks that are not specifically required for compliance with industry and/or governmental safety standards. Thus, although the system processor is designed to interoperate with the safety processor in a manner that can improve the overall performance, feature set, and/or functionality of the hazard detector 400, its operation is not required in order for the hazard detector 400 to meet core safety-related industry and/or government safety standards. Being generally a larger and more capable processor than the safety processor, the system processor will generally consume more power than the safety processor when both are active.

Similarly, when both processors are inactive, the system processor will still consume more power than the safety processor. The system processor can be operative to process user interface features and monitor interface sensors (such as occupancy sensors, audio sensors, cameras, etc., which are not directly related to core safety sensing). For example, the system processor can direct wireless data traffic on both high and low power wireless communications circuitry, access non-volatile memory, communicate with the safety processor, and cause audio to be emitted from speaker 550. As another example, the system processor can monitor interface sensors to determine whether any actions need to be taken (e.g., shut off a blaring alarm in response to a user detected action to hush the alarm). The safety processor can be operative to handle core safety related tasks of the hazard detector 400. The safety processor can poll safety sensors (e.g., smoke, CO) and activate alarm device 560 when one or more of safety sensors indicate a hazard event is detected. The safety processor can operate independently of the system processor and can activate alarm device 560 regardless of what state the system processor is in. For example, if the system processor is performing an active function (e.g., performing a Wi-Fi update) or is shut down due to power constraints, the safety processor can still activate alarm device 560 when a hazard event is detected.

In some embodiments, the software running on the safety processor may be permanently fixed and may never be updated via a software or firmware update after the hazard detector 400 leaves the factory. Compared to the system processor, the safety processor is a less power consuming processor. Using the safety processor to monitor the safety sensors, as opposed to using the system processor to do this, can yield power savings because safety processor may be constantly monitoring the safety sensors. If the system processor were to constantly monitor the safety sensors, power savings may not be realized. In addition to the power savings realized by using safety processor for monitoring the safety sensors, bifurcating the processors can also ensure that the safety features of the hazard detector 400 always work, regardless of whether the higher level user interface works. The relatively high power wireless communications circuitry can be, for example, a Wi-Fi module capable of communicating according to any of the 802.11 protocols.

By way of example, the relatively high power wireless communications circuitry may be implemented using a Broadcom BCM43362 Wi-Fi module. The relatively low power wireless communications circuitry can be a low power Wireless Personal Area Network (6LoWPAN) module or a ZigBee module capable of communicating according to an 802.15.4 protocol. For example, in one embodiment, the relatively low power wireless communications circuitry may be implemented using an Ember EM357 6LoWPAN module. The non-volatile memory can be any suitable permanent memory storage such as, for example, NAND Flash, a hard disk drive, NOR, ROM, or phase change memory. In one embodiment, the non-volatile memory can store audio clips that can be played back using the speaker 550. The audio clips can include installation instructions or warnings in one or more languages. The interface sensors can includes sensors that are monitored by the system processor, while the safety sensors can include sensors that are monitored by the safety processor. Sensors 220 and 232 can be mounted to a printed circuit board (e.g., the same board processor 210 and 230 are mounted to), a flexible printed circuit board, a housing of system 205, or a combination thereof.

The interface sensors can include, for example, an ambient light sensor (ALS) (such as can be implemented using a discrete photodiode), a passive infrared (PIR) motion sensor (such as can be implemented using an Excelitas PYQ1348 module), and one or more ultrasonic sensors (such as can be implemented using one or more Manorshi MS-P1640H12TR modules). The safety sensors can include, for example, the smoke detection chamber 430 (which can employ, for example, an Excelitas IR module), the CO detection module 570 (which can employ, for example, a Figaro TGS5342 sensor), and a temperature and humidity sensor (which can employ, for example, a Sensirion SHT20 module). The power source can supply power to enable operation of the hazard detector and can include any suitable source of energy. Embodiments discussed herein can include AC line power, battery power, a combination of AC line power with a battery backup, and externally supplied DC power (e.g., USB supplied power). Embodiments that use AC line power, AC line power with battery backup, or externally supplied DC power may be subject to different power conservation constraints than battery only embodiments.

Preferably, battery-only powered embodiments are designed to manage power consumption of a finite energy supply such that hazard detector 400 operates for a minimum period of time of at least seven (7), eight (8), nine (9), or ten (10) years. Line powered embodiments are not as constrained. Line powered with battery backup embodiments may employ power conservation methods to prolong the life of the backup battery. In battery-only embodiments, the power source can include one or more batteries, such as the battery pack 450. The batteries can be constructed from different compositions (e.g., alkaline or lithium iron disulfide) and different end-user configurations (e.g., permanent, user replaceable, or non-user replaceable) can be used. In one embodiment, six cells of Li—FeS$_2$ can be arranged in two stacks of three. Such an arrangement can yield about 27000 mWh of total available power for the hazard detector 400.

Figure 5C:
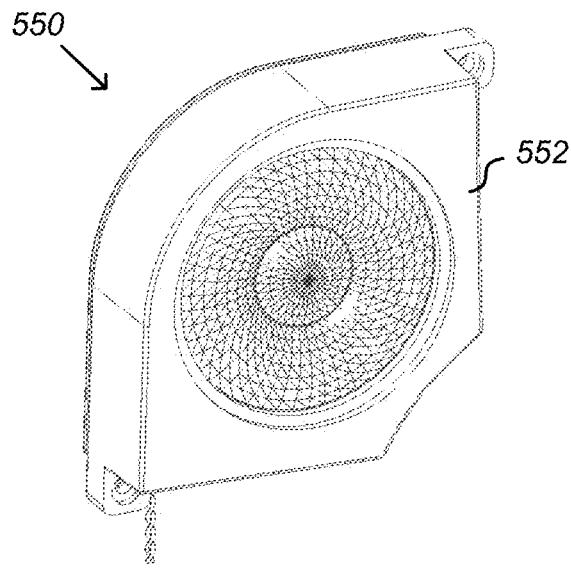
FIGS. 5C-5D illustrate front and rear perspective views of a speaker that is mountable on the circuit board of the hazard detector of FIGS. 4A-4B, according to some embodiments.
Figure 5D:
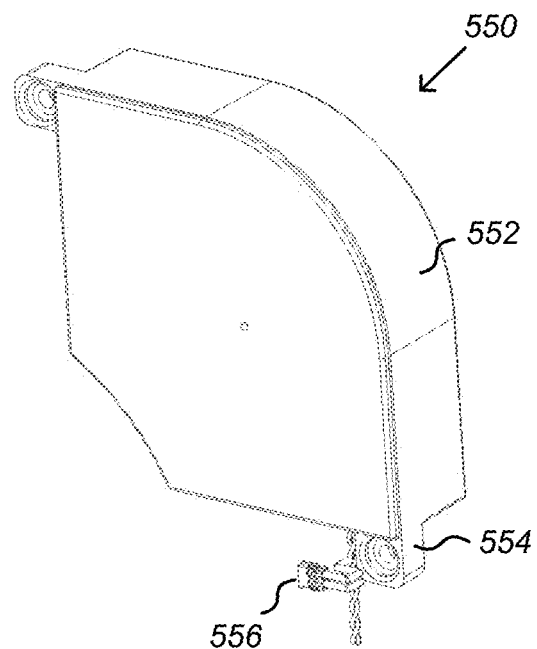

Referring now to FIGS. 5C and 5D, illustrated are front and rear perspective views of a speaker 550 that is electrically coupled with circuit board 500 so as to receive instructions therefrom. Speaker 550 includes a speaker body 552 and one or more mounting flanges 554 that allow the speaker 550 to be coupled with or mounted on front casing 460. Speaker 550 also includes a plug 556 or other mounting component that allows the speaker 550 to be electrically coupled with circuit board 500. As previously described, speaker 550 may be used to audibly alert an occupant of a room within which hazard detector 400 is positioned, or to provide other messages to the occupant of the room. For example, speaker 550 may be used to alert a firefighter or other rescuer regarding the occupants remaining in the home or structure after a fire or other danger is detected or may be used to inform an occupant of a safest route out of the home or structure.

Figure 6A:
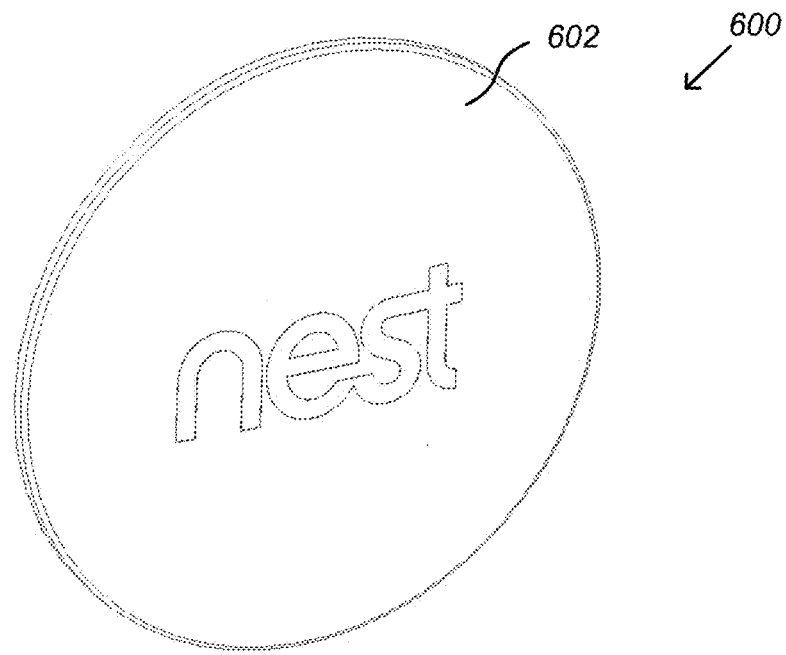
FIGS. 6A-6B illustrate front and rear perspective views of a lens button of the hazard detector of FIGS. 4A-4B, according to some embodiments.
Figure 6B:
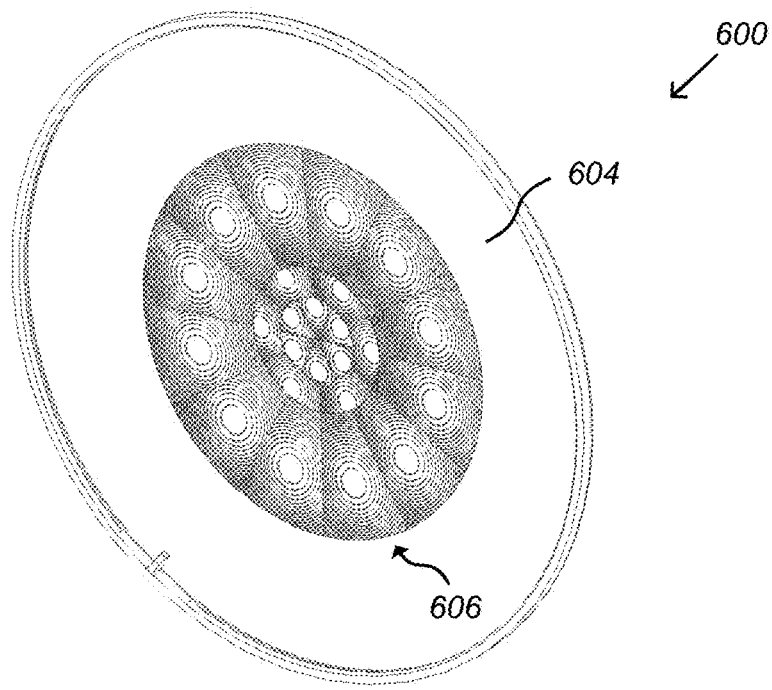

Referring now to FIGS. 6A and 6B, illustrated are front and rear perspective views of a lens button 600. Lens button 600 includes a front surface 602 and a rear surface 604. Lens button 600 is configured to be coupled with front casing 460 by attaching lens button 600 to light ring 620, and coupling light ring 620 to a surface portion of front casing 460, as shown in FIG. 4B. Lens button 600 is configured to be pressed by a user to provide input to hazard detector 400 and/or for various other purposes, such as quieting an alarm device. Lens button 600 is further configured to be transparent to one or more sensors positioned behind lens button 600. For example, in one embodiment, a PIR sensor is positioned behind lens button 600. The PIR sensor is able to view external objects through lens button 600 to determine if an occupant is present within a room in which hazard detector 400 is positioned.

The rear surface 604 of lens button 600 may have a Fresnel lens pattern 606 that allows the PIR sensor, or another sensor, positioned behind lens button 600 to view far into the room in which hazard detector 400 is positioned. In one embodiment, Fresnel lens pattern 606 may include a plurality of concentrically arranged rings that each provides a slightly different viewing cone. Each concentrically arranged ring may provide a progressively larger viewing area or cone than rings concentrically arranged and located radially closer to a central axis of lens button 600. In one embodiment, an internal angle of the viewing cones provided by Fresnel lens pattern 606 may vary from between about 15° and about 150° so as to provide a viewing radius on a floor or wall positioned directly in front of the hazard detector 400 at a distance of approximately 10 feet or between about 0.5 m and about 8.8 m. In this manner, the PIR sensor, or other sensor, positioned behind lens button 600 may easily detect the presence of an occupant within a room in which hazard detector 400 is positioned.

Figure 6C:
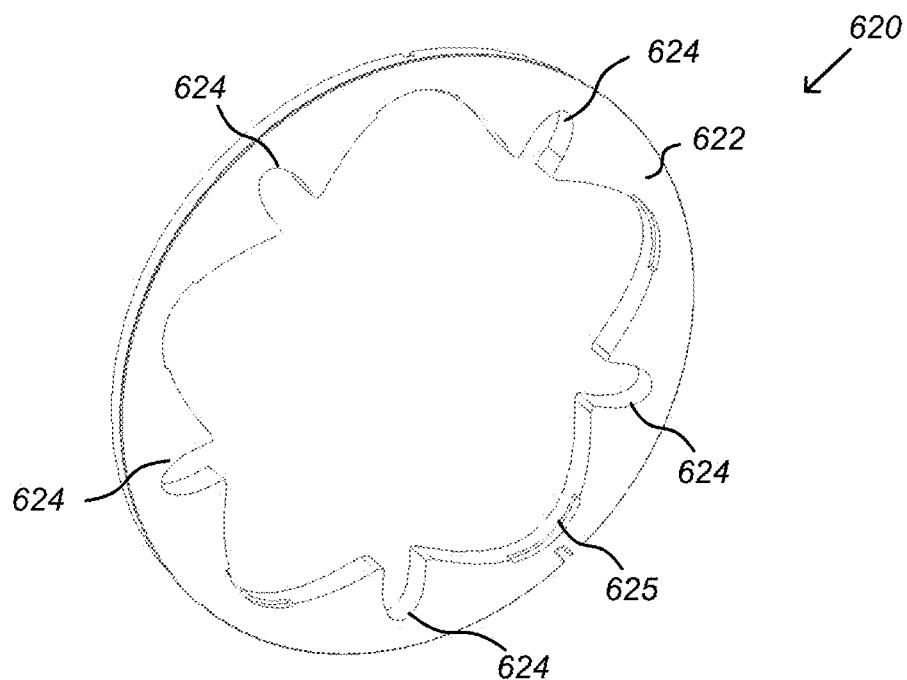
FIGS. 6C-6D illustrate front and rear perspective views of a light guide of the hazard detector of FIGS. 4A-4B, according to some embodiments.
Figure 6D:
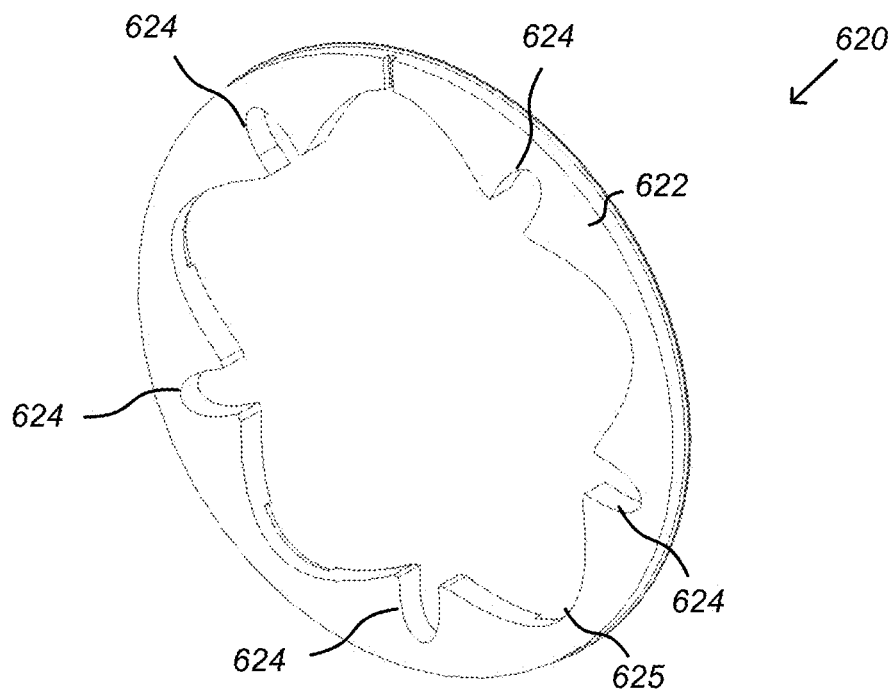

Referring now to FIGS. 6C and 6D, illustrated are front and rear perspective views of a light ring 620 that may be used to disperse light provided by an LED or other light source so as to provide a halo effect behind and around lens button 600. Light ring 620 includes a body portion 622 and may be coupled with lens button 600 via adhesive bonding or any other method known in the art. In turn, light ring 620 may be coupled with front casing 460 such as by orienting light ring 620 with respect to a surface of front casing 460 and pressing light ring 620 axially downward relative to front casing 460 so that recessed portions 625 of light ring 620 mate and couple with tabs (not shown) of front casing 460. These tabs may fit over the recessed portions 625 of light ring 620 and secure light ring 620 adjacent a surface of front casing 460. Light ring 620 also includes a plurality of second recesses 624 within which an LED (not shown) or other light source may be positioned to illuminate light ring 620. In operation, light ring 620 disperses light provided by the LED or other light source to provide a halo effect behind and around lens button 600.

Figure 6E:
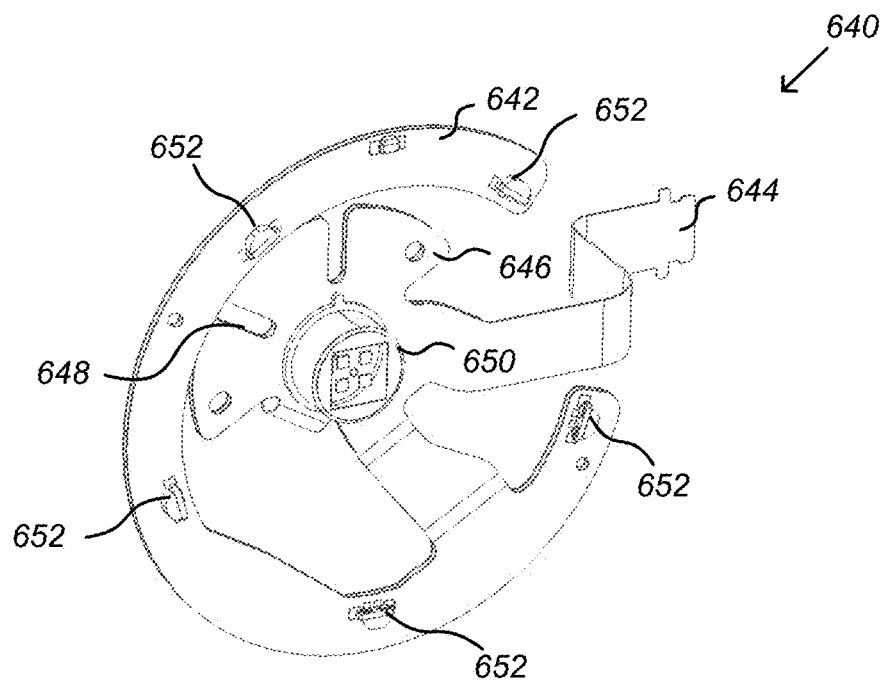
FIGS. 6E-6F illustrate front and rear perspective views of a flexible strip of the hazard detector of FIGS. 4A-4B, according to some embodiments.
Figure 6F:
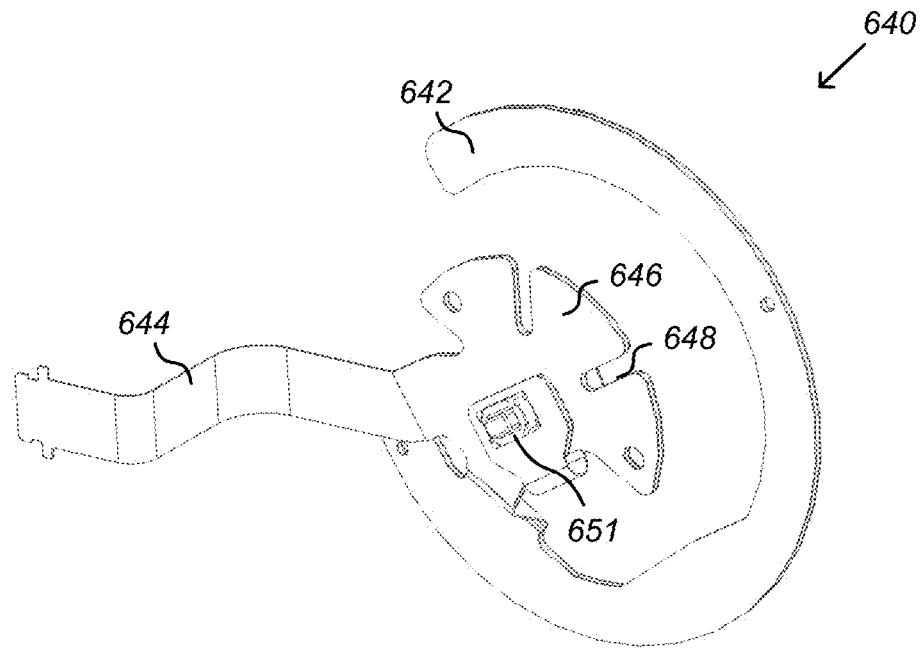

Referring now to FIGS. 6E and 6F, illustrated are front and rear perspective views of a flexible circuit board or flex ring 640 that may electrically couple components positioned in front of circuit board 500, such as lens button 600, with circuit board 500. Flex ring 640 includes a tail end or ribbon 644 that may be insertable into a component of circuit board 500 to electrically couple lens button 600, light ring 620, and/or one or more components with circuit board 500. Flex ring 640 also includes a central portion that may include a PIR sensor 650 that is positioned so as to be behind lens button 600. The central portion of flex ring 640 further includes a plurality of flanges 646 that mate with flanges (not shown) of front casing 460 so as to orient flex ring 640 relative to front casing 460 and/or couple flex ring 640 therewith. Specifically, a channel 648 between flanges 646 may fit around flanges (not shown) of front casing 460 to orient and couple flex ring 640 with front casing 460. Flex ring 640 further includes a circumferentially arranged ring portion 642 having a plurality of LED lights 652, or other source of light, coupled therewith. The plurality of LED lights 652 are arranged so as to be insertable within recessed portions 624 of light ring 620. LED lights 652 illuminate light ring 620 as previously described. A bottom surface of the central portion of flex ring 640 includes a pressable button 651 that is actuated as lens button 600 is pressed by a user. In this manner, input is provided to the hazard detector 400 by the user as previously described.

As mentioned above, embodiments of the present invention, e.g., hazard detectors 104 and 400, may be paired with an online management account. This pairing may be accomplished during the setup process for a smart hazard detector. Examples of this setup process according to the present invention are discussed in the next section.

Initial Background Noise Signatures

Many of the smart-home devices described above in FIGS. 1-6 can be modified or designed, in light of this disclosure, to include one or more sound recording devices, such as a microphone. Along with other sensors, a sound recording device can be used to ascertain the state of the environment within an enclosure. Sound inputs can also be used to control any of the devices in the smart home system. For example, an occupant of a home may wish to control a hazard detector using a voice command such as "silence the alarm." As smart-home devices are proliferated within an enclosure, each can be designed with an integrated or add-on sound recording device to form an interconnected network of sound recording stations such that users can control any smart home function from almost anywhere in their home. For example, a user can speak a voice command such as "turn on the dishwasher" that is captured by microphone of a hazard detector in the master bedroom. The hazard detector can then interpret and/or forward the voice command to the dishwasher or other smart appliance. In other scenarios, an interconnected system of microphone-equipped smart-home devices can form an intercom system, an emergency notification system, a home-wide phone system, and/or an environment in which users can verbally command any smart-home device or function from anywhere in their home.

When receiving voice commands or recording other sounds of interest, smart-home devices will often encounter significant levels of background noise. For example, a user asking a smart thermostat to "turn up the temperature" may be speaking while vacuuming, while the dishwasher is running, or while the HVAC system is operating. These appliances and activities can generate background noise that may cause the smart-home device recording the voice commands to miss or misinterpret what is said by the user. Generally, when voice commands are misinterpreted by any voice-control system, users become frustrated and inpatient, often leading users to abandon voice control options altogether, and instead settling for traditional manual control techniques. In order to deal with background noise when recording voice commands and other sounds of interest, the smart-home devices described herein can utilize noise cancellation algorithms combined with a background noise profile database that is continuously or periodically updated.

Traditional noise cancellation algorithms generally begin at a starting state were both background noise and foreground sounds are present, and then gradually converge to a state where most of the background noise is being filtered out while the foreground sounds are allowed to pass through the filtering operation. When a traditional noise cancellation algorithm begins receiving sound captured by microphone, the convergence interval is used to distinguish between the background noise and the foreground sounds. The algorithm can determine a background noise profile during this convergence interval and then remove that background noise profile from the recorded sound, leaving only the foreground sound. As used herein, foreground sounds may refer to any type of sound that is intended to be recorded by the microphone or sound recorded in order to control or influence the behavior of a smart-home device, such as a voice command. Background noise a refer to any sound that is not a foreground sound.

In some embodiments, background noise may specifically refer to steady-state noises generated by smart home appliances, such as dishwashers, air-conditioners, refrigerators, and so forth. Background noise may also refer to low-level noise such as a vacuum cleaner, a television in another room, sounds originating from outside of the home environment, such as construction noises, airline traffic, passing trains, and so forth. A noise signature or sound signature may refer to any information associated with a sound signal that can be used as an input to a noise cancellation algorithm in order to attenuate an associated background sound signal from the recording. A sound signature or noise signature may comprise a recording of the noise or sound, a frequency analysis, a decibel level, and/or any combination of these or other characteristics of the noise or sound.

When using traditional noise-cancellation algorithms to filter out background noise, some existing applications are able to begin recording before a voice command is given. For example, a laptop computer will generally receive a command from the user to activate a microphone. Upon activation, the laptop computer can begin recording background noise and quickly determine a background noise signature before the user actually starts speaking to the laptop computer. Similarly, when a user intends to use a smart phone, they will activate the phone feature, dial a number, and position the phone next to their head before they actually begin speaking. The noise cancellation algorithms can use this time to ascertain a background noise signature before the user's phone conversation begins. In general, existing solutions will provide a device an indication that sounds of interest (i.e. foreground sounds) will begin after a short delay interval. The device can then record background noise before the foreground sounds begin. Thus, when users begin speaking the noise cancellation algorithm will have already converged, and the user will not have to endure a few seconds of sound modulations and fluctuations in waiting for the algorithm to converge. For example, when using a smart phone to make a telephone call, the smart phone can record background noise, such as the sound of a car engine running, identify the background noise as such, and converge the noise cancellation algorithm before the user even says "hello."

However, in using voice commands to control smart-home devices, this traditional solution in certain cases may be inadequate. Most voice commands are very short, abrupt, and provided with little or no warning to a recording smart-home device. For example, a user may say "hello thermostat, set the temperature to 75°" or "hello hazard detector, ignore the smoke." Each of these exemplary commands may only last one or two seconds, which typically is not enough time for a noise cancellation algorithm to converge. By the time the noise cancellation algorithm was able to distinguish the background noise from the foreground sound, the command would be over, and the user would expect the command to be executed.

The embodiments described herein may be configured to detect the start of a voice command and immediately apply a background noise signature as the starting state of the noise cancellation algorithms. The background noise signature can be selected from a plurality of background noise signatures that have been previously collected over time. By knowing the starting state of the background noise, the noise cancellation algorithm can be immediately applied without having to wait for a convergence interval. Thus, a known background noise signature can be filtered out of even the shortest of voice commands. For example, a user may give a voice command to their hazard detector while the dishwasher is running. The hazard detector can determine of the dishwasher is running and select the background noise signature associated with the dishwasher as a starting state for the noise cancellation algorithm without needing to wait through a convergence interval to distinguish the background noise of the dishwasher from the foreground sound during the voice command.

As will be described in greater detail below, a database of background noise signatures can be built up over time as different background noise events occur. Each background noise signature can be associated with attributes that can help predict when that particular background noise will occur again. By way of example, the background noise signature associated with the dishwasher may be most likely to occur between the hours of 7:00 PM and 8:00 PM when the home is occupied and when the television is not on. When a voice command is detected by a smart-home device, the smart-home device can receive an environmental input, such as a time of day, a status of an appliance in the home, an occupancy sensor input, a temperature reading, and/or the like, and automatically select from the background noise signature database one or more starting noise signatures for the noise cancellation algorithm. The entire smart home system including the devices, the appliances, the sensors, and/or other computing devices can all work in concert to receive and provide environmental inputs, build the background noise signature database, capture, process, and store individual noise signatures, and capture and filter voice commands. Some embodiments may also receive, store, process, and provide background noise signatures at a remote server, such as a cloud server, smart-home device management server, etc.

For exemplary purposes, the methods and systems for implementing a background noise signature database will be described in relation to a hazard detector, such as the hazard detector of FIGS. 4-6. However, other embodiments are not so limited. Other embodiments may use these noise cancellation techniques in a thermostat, a door entry system, a security system, an intercom system, and/or any other smart-home device.

Figure 7:
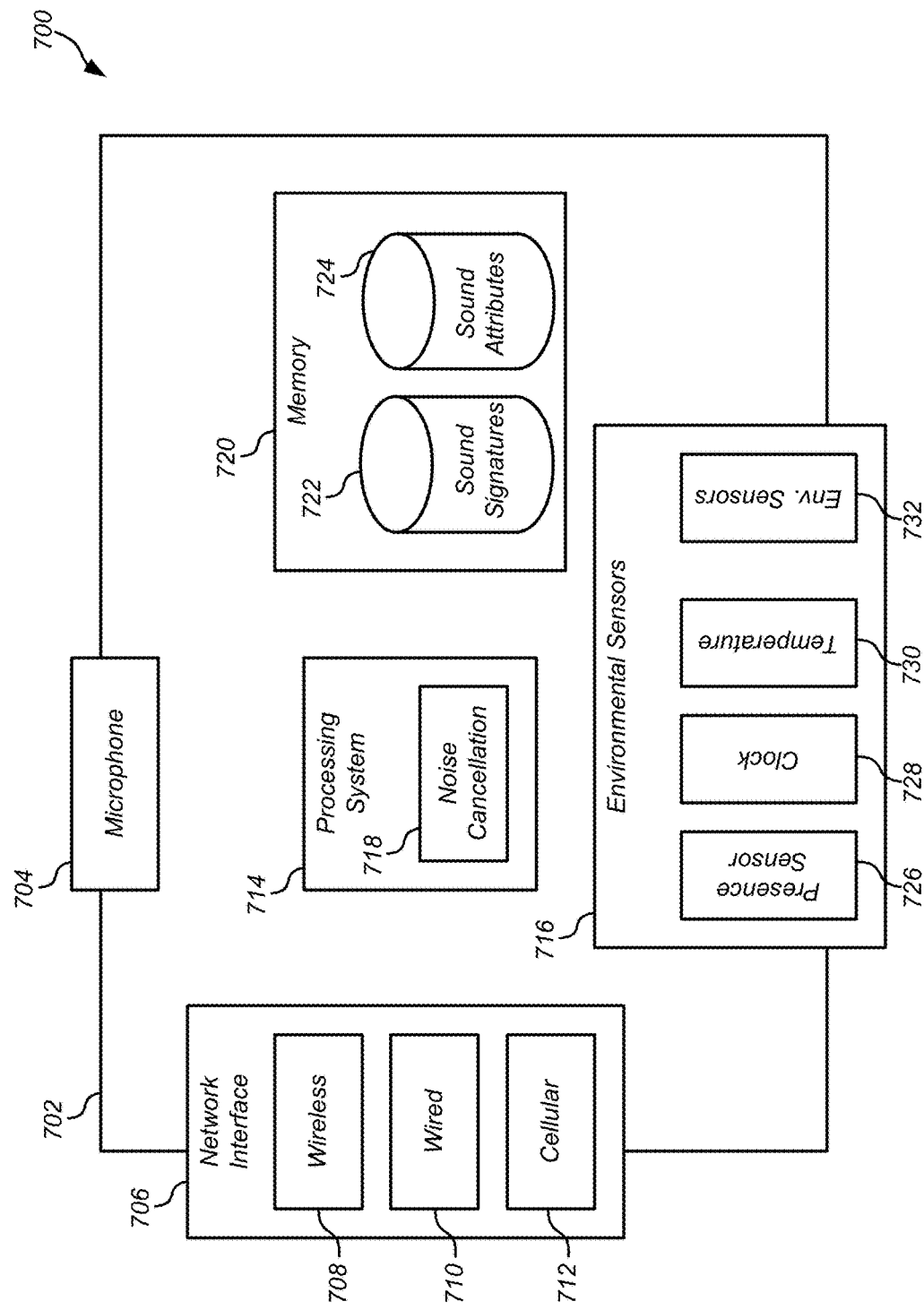
FIG. 7 illustrates a block diagram of a smart-home device architecture, according to some embodiments.

FIG. 7 illustrates a block diagram 700 of a smart-home device architecture, according to some embodiments. This smart-home device 702 may be considered a generic device that may be augmented to perform a number of different functions. For example, the smart-home device 702 may be modified to correspond to the architecture of the hazard detector described above in FIGS. 1-6. The features and systems of the smart-home device 702 may be generically incorporated into a hazard detector, a thermostat, a security system module, a surveillance system module, and/or any other smart device/appliance. For example, a thermostat, hazard detector, etc., may include a network interface 706 that includes a wireless connection 708 (e.g., 802.11, 802.15.4, etc.), a wired connection 710 (e.g. ethernet, coaxial cable, telephone line, DSL, etc.), and/or a cellular connection 712 for communicating with other smart-home devices, management servers, mobile computing devices, and/or the like.

The smart-home device 702 may include one or more environmental sensors 716, such as a presence sensor 726 (e.g., PIR, microwave, etc.), a temperature sensor 730, and/or other environmental sensors 732, such as pressure sensors, light sensors, carbon monoxide detectors, and/or the like. Although not technically a sensor per se, the smart-home device 702 may also include a clock 728. The clock 728 may be implemented internally, or the smart-home device 722 may receive a clock signal from a central server, a cellular service provider, a network connection, or another smart-home device/appliance. These and other environmental sensors can be used to determine what is happening around the smart-home device 722 when recording begins. For example, the clock 728 can provide a time-of-day input and the presence sensor 726 can provide an occupancy status, and these can be used to select a background noise signature to be used by the noise cancellation algorithm when the recording begins.

Additionally, the smart-home device 702 may include a microphone 704 that may be used to capture recorded sound used by the noise cancellation algorithm. For embodiments involving smart-home devices that would normally include a microphone, the microphone 704 may simply piggyback on the existing architecture. For example, an intercom system will have modules equipped with microphones, and the embodiments described herein can use these existing microphones for noise cancellation. In another example, a thermostat might not typically include a microphone, and thus the thermostat can be modified to include the microphone 704 to accept voice commands and perform noise cancellation. In some embodiments, the microphone 704 can remain in a perpetually active state such that it is constantly detecting surrounding sounds. The microphone 704 can be coupled to a processing system 714 that analyzes the surrounding sounds and detects verbal commands or other sound signatures that can be used to generate a response from the smart-home device 702. For example, the processing system 714 can analyze incoming sounds to identify phrases such as "Hello Nest," or "Voice Command" and then respond accordingly. Such a command may trigger the processing system 714 to begin recording sound and/or performing a noise cancellation algorithm. In some embodiments, the microphone 704 can activate in response to inputs received from other environmental sensors 716. For example, the microphone 704 can become active and record sounds when the presence sensor 726 determines that an enclosure is occupied or that a user is within the immediate vicinity of the smart-home device 702. Other inputs can be used to activate microphone 702, such as a manual user input (e.g. pressing a button on a thermostat or hazard detector), controlling the smart-home device 702 with a smart phone, or performing a physical hand or arm gesture in view of the smart-home device 702. In some embodiments the microphone 704 can be activated in response to an alarm condition or other detected environmental condition by the smart-home device 702 or other smart-home devices in the enclosure. For example, microphone 704 may be activated in response to a smoke alarm in order to accept voice commands for silencing a hazard detector, contacting an emergency response service, and/or the like.

As described above, the smart-home device 702 may include a processing system 714 configured to receive sounds detected by the microphone 704 and perform one or more noise cancellation algorithms. The processing system 714 may include a noise cancellation module 718 in software/hardware to perform such algorithms. It will be understood that the processing system 714 may include a dedicated processing system for the microphone 704 and a noise cancellation algorithm. In other embodiments, the processing system 714 may comprise a microprocessor or microcontroller that is programmed to perform other operations, such as communicating through the network interface 706, polling and analyzing readings from the environment sensors 716, controlling environmental systems, such as an HVAC system, and/or the like. The processing system 714 may be split among one or more microprocessors and possibly mounted to different circuit boards within the smart-home device 702, such as a back plate circuit board and/or a head unit circuit board.

Smart-home device 702 may also include one or more memories 720 that include a sound signature data store 722 and a sound attribute data store 724. The sound signature data store 722 may be configured to store a plurality of sound signatures that can be accessed and retrieved as the background noise signature for the noise cancellation algorithms. Each sound signature may be associated with one or more sound attributes. These attributes may be used to determine when a particular sound signature should be selected as the initial background noise signature. For example, a sound signature corresponding to a refrigerator compressor may have attributes that describe a time of day when the refrigerator compressor is most likely to be active, an input condition that may be received from the refrigerator itself when the compressor is active, and/or the like. Each sound signature may be associated with one or more sound attributes, and the sound attributes may be stored in a separate data store as illustrated by FIG. 7, or in the same data store as the sound signatures themselves.

The arrangement of modules and functions as illustrated in FIG. 7 is merely exemplary and not meant to be limiting. Other embodiments may add additional modules, such as additional environmental sensors, additional network communication options, different memory configurations, and distributed processing systems. Therefore, it will be understood that each module in FIG. 7 may be combined with other modules or subdivided into additional sub-modules as needed. Additionally, each module may be implemented in hardware, software, or a combination of hardware/software.

Figure 8:
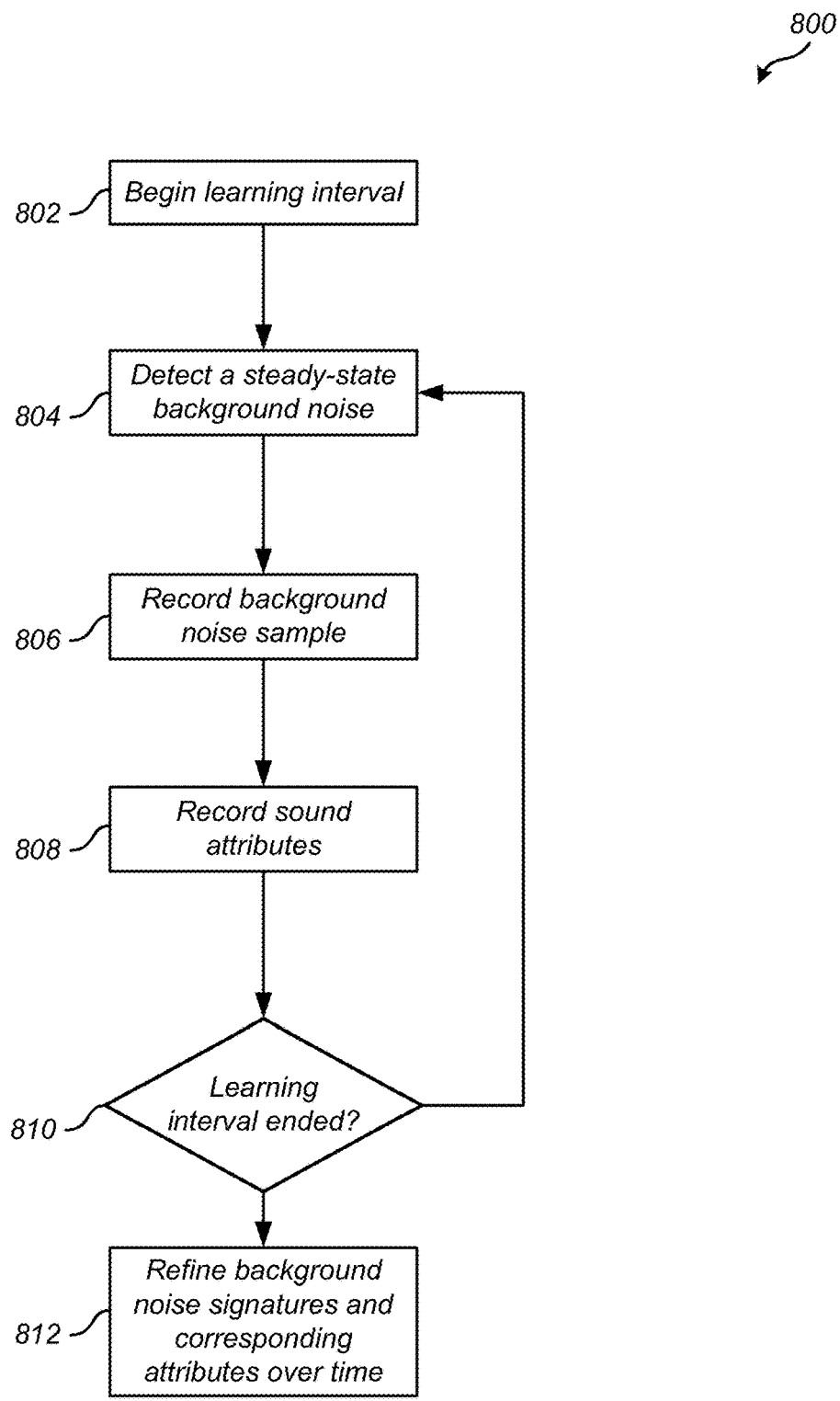
FIG. 8 illustrates a flowchart of a method for building a database of stored sound profiles, according to some embodiments.

FIG. 8 illustrates a flowchart 800 of a method for building a database of stored sound profiles, according to some embodiments. The method may include beginning a learning interval (802). In some embodiments, the learning interval may correspond to a time interval that begins following the installation of the smart-home device and lasts for a predefined number of days or weeks. For example, the learning interval may begin upon installation and last for an interval of three weeks. In some embodiments, the learning interval may be instituted periodically throughout the lifetime of the smart-home device. For example, a learning interval may begin each night at midnight and last until 6:00 AM. In embodiments where sound is continuously recorded by a microphone on the smart-home device, the learning interval may be extracted from recordings occurring immediately prior to receiving a voice command. Once a voice command is recognized, the sounds in the previous 30 seconds, one minute, 90 seconds, five minutes, etc., may be analyzed as a "learning interval." In some embodiments, the learning interval may begin when a presence sensor on the smart-home device—possibly in conjunction with present sensors in other smart-home devices—determine that the enclosure is unoccupied, thereby reducing the chance of interfering background noise caused by human occupants.

The method may also include detecting a steady-state background noise (804). Some embodiments may limit their sound signature database to steady-state sound patterns that will be substantially the same throughout the recording interval. For example, appliances such as refrigerators, HVAC systems, fluorescent lights, computer fans, microwave ovens, and so forth, will generally produce a somewhat consistent steady-state sound during their operation. When using these types of steady-state sounds as the initial background noise signature for a noise cancellation algorithm, the algorithm will have very little work to do in order to converge and produce relatively noise-free sound. Other embodiments may also analyze and record more transient sound signatures. These may include sounds such as television noise, a vacuum cleaner, low-level radio sounds, construction noise, power tools, and so forth. These more transient sound signatures may also be useful in situations where voice commands that are received are relatively short. For example, a voice command such as "increase the temperature by 5°" may only take two or three seconds to capture, and a transient noise, such as a drill or a blender, will be relatively steady-state during the short interval of the voice command.

During a learning interval, background noises may be detected by passively listening to the surrounding environment and identifying sounds that are persistent, repetitive, and/or loud enough to be considered a potential source of background noise interference. For instance, the noise of blender could be detected two or three different times during a learning interval. On the third repetition, the method could identify the noise of the blender as a potential background noise source. In another example, a microwave oven could begin operating, and after 10 seconds, 15 seconds, 20 seconds, etc., the method could identify the sound of the microwave oven as a potential background noise source.

The method may also include recording background noise samples (806). The background noise samples may be recorded by the microphone on the smart-home device and stored locally in a memory on the smart-home device. Sound processing algorithms can be used to isolate the background noise in the recording. For example, if the sound associated with a refrigerator compressor is being recorded, the smart-home device can filter out other noise, such as human voices, doors closing, dishes being loaded into a dishwasher, and so forth.

The recorded background noise samples may be recorded and/or stored in many different formats depending on the particular embodiment. In one embodiment, the actual recording of the background noise sample may be stored in a one second clip, a two second clip, a five second clip, and/or the like. In other embodiments, a frequency analysis may be performed, and the dominant frequencies of the recorded background noise sample can be stored. In other embodiments, the recorded background noise can be used to select from a plurality of pre-recorded background noise signatures such that the newly recorded background noise does not need to be stored.

In some embodiments, a management server in communication with the smart-home device can store sound signatures for common household appliances. The recorded background noise can be sent to the management server, which can then determine the household appliance with the closest match to the recorded sound. For example, the smart-home device can record the sound of a dishwasher. However, the recording of the dishwasher may include other background noise sounds, such as voices or running water, and the microphone of the smart-home device may not be located in a position that is ideal for capturing the sound of the dishwasher. The recorded dishwasher sound or sound signature can be transmitted to the management server, and the management server can determine that the dishwasher is most likely a particular make/model/year and retrieve a corresponding pre-stored sound signature for that particular dishwasher. This signature can then be transmitted to the smart-home device for use in noise cancellation. This type of embodiment offers the advantage that background noise signatures can be recorded in isolation by a manufacturer of the smart-home device without needing to exclude other background noises. In some embodiments, the management server can receive recordings from a number of different smart-home devices in different homes. The management server can then select the best representative sample of background noise. For example, the management server could receive recordings of 10 different dishwashers of the same make/model/year. The management server could then select the recording having the best sound quality. That recording can then be transmitted to the 10 different smart-home devices in different homes and used for noise cancellation each.

In some embodiments, a particular smart-home device can make multiple recordings of the same background noise and select the recording with the highest quality. For example, the hazard detector located in a kitchen could make five different recordings of a refrigerator compressor at different times of day. After analyzing the five different sound recordings, the smart-home device can select the recording made during an unoccupied time interval that has the fewest number of interfering sounds.

The method may also include recording sound attributes for the captured background noise samples (808). As described briefly above, sound attributes can be any data that characterizes when the background noise sample is likely to occur again in the future. By way of example, a sound attribute may include an indication from a smart home appliance that the appliance is operating. For instance, a refrigerator may generate a signal indicating that the refrigerator compressor has turned on. This attribute may be used to determine that the recorded sound is likely the sound of the refrigerator compressor, and that this particular recorded background noise signature should be used when such a signal is generated by the refrigerator. Sound attributes may also include a time of day, a probability of occupancy, a temperature measurement, an input received from a user directly at the smart-home device or through another computing device, and so forth. An attribute may also be assigned by user input. For example, a user may indicate that a refrigerator is running, a vacuum cleaner is operating, a fan is running, etc., through a user interface of the smart-home device. Attributes may also include smart appliance schedules received from other smart-home devices. For example, a smart thermostat may include a schedule of when the HVAC system will be operating. The schedule can be shared with other smart-home devices in the enclosure, and the smart-home devices can utilize the shared schedule to determine when a background noise signature corresponding to the HVAC system should be selected for noise cancellation.

The stored sound attributes can be used to establish one or more environmental contexts during which each identified background noise sample is most likely to occur. As will be described in greater detail below, when starting a noise cancellation algorithm, one or more environmental inputs can be received that correspond to different attributes associated with the background noise signatures. Attribute values can be compared (e.g., the current time of day can be compared to an attribute time of day) in order to select one or more background noise samples that are most likely to be occurring when the noise cancellation algorithm is initialized.

The method may continue until the learning interval is concluded (810). In order to adapt to changing environmental circumstances, to account for new appliances in the enclosure, and/or to generally improve performance, the smart-home device can continuously refine background noise signatures and their corresponding attributes over time (812). Although the current learning interval may have concluded, future learning intervals may be carried out in the periodically or as needed. For example, a learning interval from 5:00 PM to 6:00 PM may have captured a number of background noise signatures with corresponding attributes. However, because this time of day is generally busy when the home is occupied, the sound signatures and corresponding attributes may not be as accurate as they could be. A future learning interval may be instituted on a day between 5:00 PM and 6:00 PM when the smart-home device determines that the enclosure is likely unoccupied.

Figure 9:
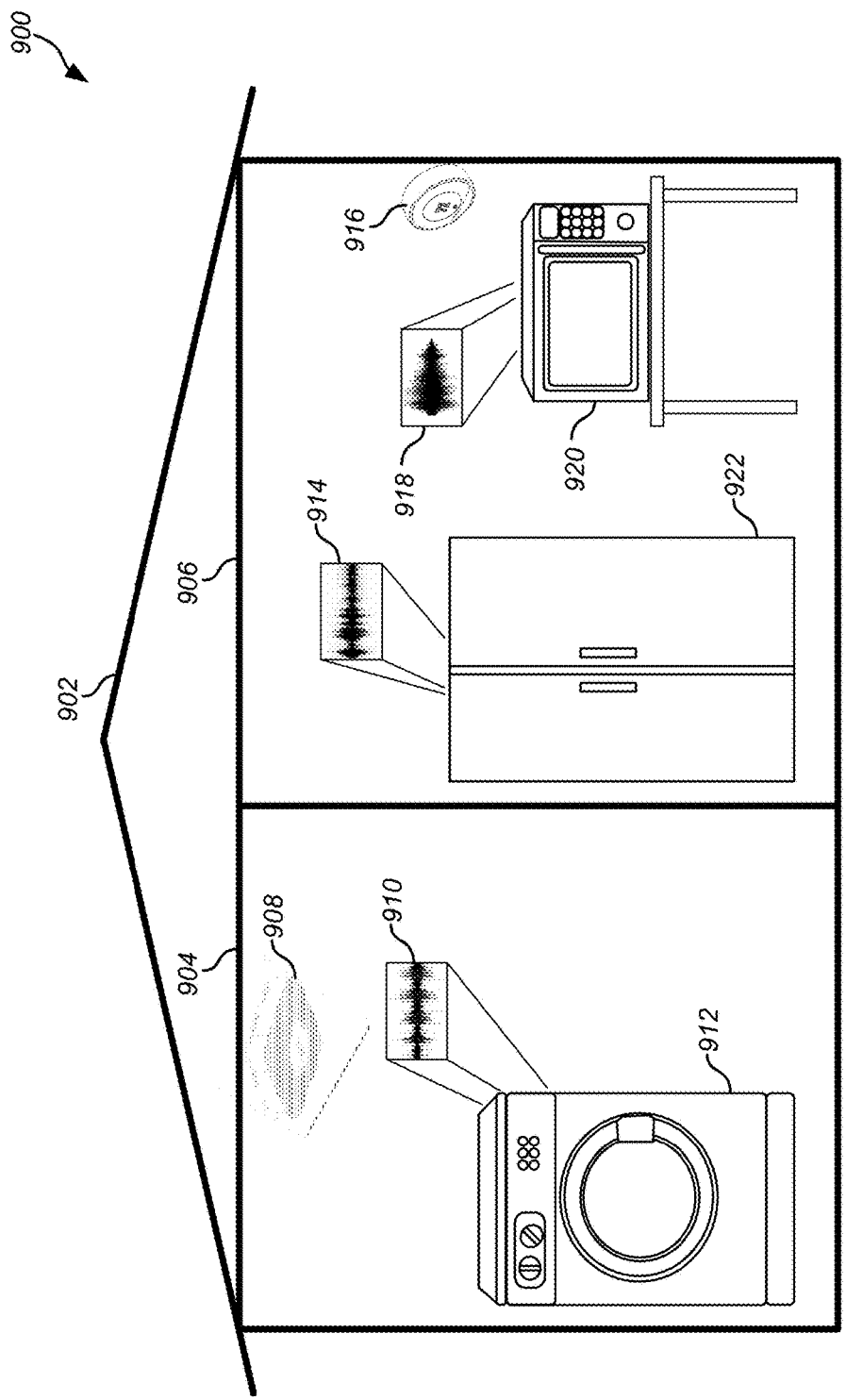
FIG. 9 illustrates a diagram of a home with one or more smart-home devices that capture sound profiles, according to some embodiments.

FIG. 9 illustrates a diagram 900 of a home with one or more smart-home devices 908, 916 that capture background noise signatures 910, 914, 918, according to some embodiments. The method of flowchart 800 described above can be carried out by a single smart-home device. Alternatively, the method of flowchart 800 and other methods may be carried out cooperatively by a network of smart-home devices within a home, or even within a group of homes communicating through the Internet. In this simplified example, enclosure 902 can include a first room 904 and a second room 906 that may or may not be adjacent. For example, the first room 904 may include a smart-home device in the form of the hazard detector 908 and appliances such as a washing machine 912. The second room 906 may include a smart-home device in the form of a thermostat 916, as well as appliances such as a refrigerator 922 and a microwave oven 920.

Each appliance may generate its own unique sound signature, and the sound signatures can be captured by any of the available smart-home devices. For example, based on their proximity to the appliances, the hazard detector 908 can capture the sound signature 910 from the washing machine 912. Similarly, the thermostat 916 can capture the sound signature 918 from the microwave oven 920. Assuming that the refrigerator 922 is against a wall separating the first room 904 from the second room 906, either the hazard detector 908 or the thermostat 916 may be best suited to capture the sound signature 914 of the refrigerator 922. In some embodiments, both the hazard detector 908 and the thermostat 916 can capture the sound signature 914 of the refrigerator 922. Both versions of the sound signature 914 can then be compared and the highest-quality version could be used by both smart-home devices. In some embodiments, the noise from occupants and other appliances in the second room 906 may make it difficult for the thermostat 916 to capture a high-quality version of the sound signature 914 of the refrigerator 922. For example, a kitchen may be frequently occupied and may have many other background sounds and other appliances that are operating at the same time. Therefore, the hazard detector 908 may be better suited in the first room 904 to capture the sound signature 914 of the refrigerator 922, as the compressor of the refrigerator 922 may propagate through the wall while the other background noises in the second room 906 do not.

In some embodiments, each smart-home device may be primarily responsible for capturing sound signatures at their respective locations. Because appliances may sound differently based on location of the smart-home device, some noise cancellation algorithms may be more effective when using a background noise signature captured from the location of the same microphone used in the sound recording for which the noise cancellation is taking place. By way of example, the hazard detector 908 may at times be susceptible to background noise from the sound signature 910 of the washing machine as well as the sound signature 914 from the refrigerator 922. However, because the sound signature 914 of the refrigerator 922 propagates through the wall of the enclosure 902, it may be more muffled or attenuated than it would sound according to the microphone of the thermostat 916. Therefore, in some cases, the sound signatures 910, 914, 918 may be centrally stored and shared between smart-home devices, while in other cases, certain sound signatures may be specific to a particular smart-home device. Some embodiments may test any available sound signatures available to a specific smart-home device for an appliance, and choose the one that causes the noise cancellation algorithm to converge the quickest. For example, the hazard detector 908 can use its own version of the sound signature 914 of the refrigerator 922, as well as the version available from the thermostat 916. After testing both of these versions of the sound signature 914, the hazard detector 908 can select the version of the sound signature 914 that causes its noise cancellation algorithms to converge the fastest.

Figure 10:
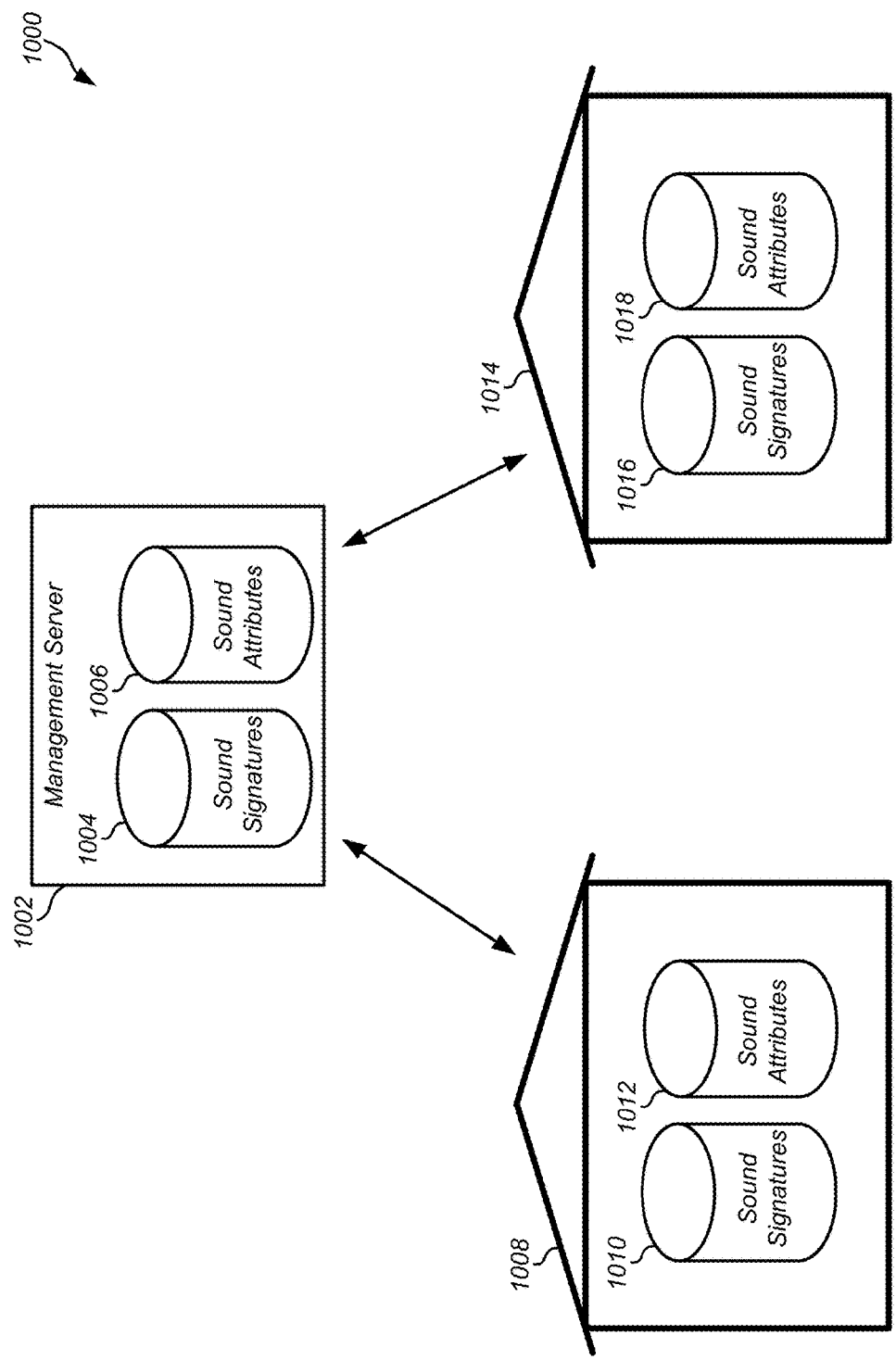
FIG. 10 illustrates a diagram of smart-home devices in multiple homes in communication with a management server, according to some embodiments.

FIG. 10 illustrates a diagram 1000 of smart-home devices in multiple homes 1008, 1014 in communication with a management server 1002, according to some embodiments. As described above, background noise signatures 1010 can be stored locally in a first home 1008 on one or more smart-home devices or on a local computer system. These sound signatures 1010 can be stored with sound attributes 1012 that are specific to the sound signatures 1010 within the first home 1008. These sound signatures 1010 and sound attributes 1012 can be locally captured in the first home 1008 and can be specific to the environment of the first home 1008. For example, the sound signatures 1010 may include the sound of the local HVAC system, and the sound attributes 1012 may include characteristics describing when the local HVAC system is likely be active.

The smart-home device network of the first home 1008 may be in communication with a remotely located management server 1002. The management server 1002 may also store sound signatures 1004 and sound attributes 1006. In some embodiments, the sound signatures 1004 and the sound attributes 1006 may include backup copies of the sound signatures 1010 and sound attributes 1012 stored at the first home 1008. In some embodiments, the sound signatures 1004 may include a relatively larger database of known sound signatures for different appliances. For example, the sound signatures 1004 may include sound signatures for different makes/model/years of different brands of refrigerators. This can allow a user to enter information regarding appliances in their home via a user interface of smart-home devices in order to select a pre-existing sound signature for those appliances. This may eliminate the need for the local smart-home device to record and analyze background sounds. Instead, the sound signatures can be downloaded from the management server 1002. Instead of receiving appliance information from a user interface, smart appliances may also be able to communicate with the smart-home device network and provide self-identifying information. This information can then be sent to the management server 1002 where appropriate background noise signature for the appliances may be retrieved and sent back to the smart-home device network of the first home 1008.

Sound attributes 1006 stored at the management server 1002 may be more general in nature than the sound attributes 1012 stored at the first home 1008. While the sound attributes 1012 stored at the first home 1008 may be specific to the sound signatures 1010 of the first home 1008 (e.g., when does the local HVAC system usually operate?), The sound attributes 1006 at the management server 1002 may be generally applicable to the sound signatures 1004 in many different homes. For example, a sound signature for refrigerator stored in the sound signatures 1004 at the management server 1002, may include in the sound attributes 1006 information descriptive of when refrigerators in general are usually active. Certain makes/models/years of refrigerators may require the compressor to operate more or less often than others, and this information can be used to determine a probability as to when each make/model/year refrigerator may be active in a home. The sound attributes 1006 at the management server 1002 can be derived from information received from multiple homes using smart-home devices. For example, the first home 1008 and a second home 1014 may both have the same brand of refrigerator. The first home 1008 and the second home 1014 may both transmit sound attribute information to the management server 1002 indicating when the refrigerator compressor is most likely to be activated. This information (and similar information from many other homes) may be used to generate a general usage attribute for sound signatures related to that particular make/model/year of refrigerator.

The sound attributes 1006 at the management server 1002 may then be used to inform the decision-making process of local smart-home devices in various homes. For example, upon initial setup, and possibly prior to or during a learning interval, smart-home devices in the second home 1014 may receive sound attributes 1006 from the management server 1002 as a starting point. These may be used until the smart-home devices in the second home 1014 are able to go through a learning interval and determine sound attributes 1018 and sound signatures 1016 for any local appliances. During a learning interval, sound signatures 1016 captured by a local smart-home device, as well as sound attributes 1018 determined by the local smart-home device may be used to adjust or replace sound attributes 1006 and/or sound signatures 1004 received from the management server 1002 as a starting point. For example, sound attributes 1006 received from the management server 1002 may indicate that a dishwasher is generally used between the hours of 6:00 PM and 8:00 PM. However, occupants of the second home 1014 may follow a different schedule. On setup, the local smart-home devices in the second home 1014 can download sound signatures and sound attributes for the make/model/year of dishwasher from the management server 1002. During a learning interval, the smart-home devices may adjust the sound signature to more closely match the sound captured by the local smart-home devices, and may also adjust the sound attributes 1018 to more closely match the schedule of the occupants of the second home 1014.

Sound signature and sound attribute information may be shared between homes based on their geographic proximity. The management server 1002 will generally know the location of the first home 1008 and/or the location of the second home 1014. Other occupant-specific information may also be made available to the management server 1002, such as the number of occupants, an occupancy schedule, energy usage information, demand-response preferences, and/or the like. This information can be used by the management server to determine whether it would be beneficial to share sound signature and sound attribute information between the first home 1008 and the second home 1014. For example, if the occupants of the first home 1008 and the occupants of the second home 1014 generally follow a similar occupancy schedule, then it is possible that the sound attributes 1012, 1018 of the two homes 1008, 1014, respectively, will be similar, and these attributes can be shared through the management server 1002.

Storing sound signatures 1004 and/or sound attributes 1006 at the management server 1002 may provide additional benefits besides sharing sound signatures and attributes between homes. In some embodiments, this information can be used to diagnose a state-of-health for local appliances. For example, the management server 1004 include a sound signature for a healthy refrigerator of a particular make/model/year installed in the first home 1008. Smart-home devices in the first home 1008 may capture and analyze a sound signature of the particular refrigerator installed in the first home 1008. The locally captured sound signature can then be compared to the healthy sound signature stored at the management server 1002. If there is significant deviation, this can be used to determine that this particular refrigerator may be malfunctioning or not operating optimally. An indication can then be provided to a user by a smart-home device that their refrigerator may be malfunctioning. It may include specific advice for a particular type of appliance (e.g., "you may need to clean your refrigerator coils"). In some embodiments, a state-of-health report can be generated for all of the known appliances in a home based on their sound signatures, and this report can be accessible through the user interface of the local smart-home devices.

Figure 11:
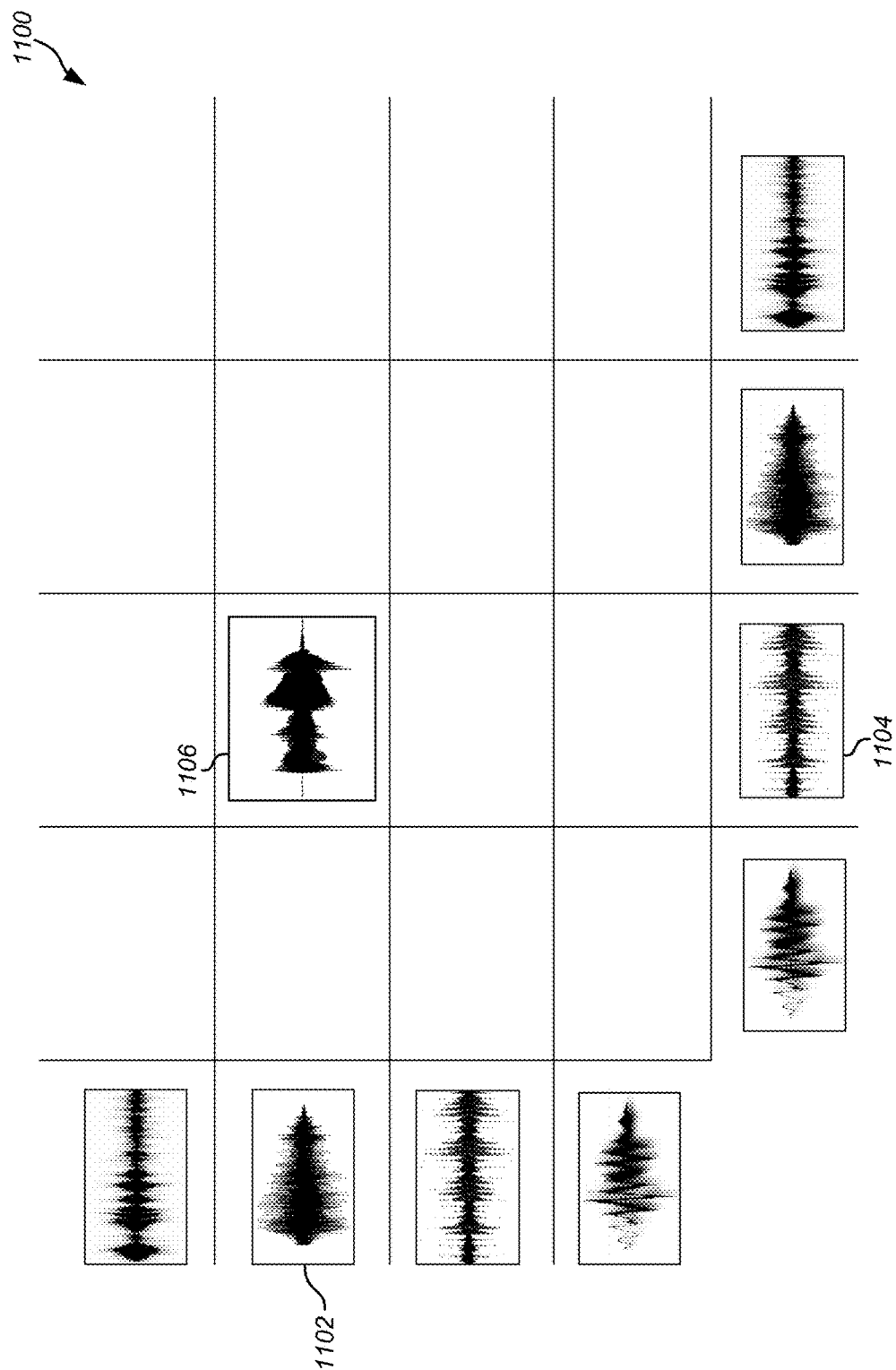
FIG. 11 illustrates a chart of how sound profiles can be combined, according to some embodiments.

FIG. 11 illustrates a chart 1100 of how sound profiles can be combined, according to some embodiments. Often within an enclosure, more than one background noise will be present when a noise reduction algorithm is run. For example, a voice command may be received by a smart-home device while multiple appliances, such as a refrigerator compressor and a dishwasher are operating at the same time. The smart-home device can handle this situation in a number of different ways. In one embodiment, sound signatures and sound attributes can be captured and stored on an individual basis. In chart 1100, each sound signature on the horizontal or vertical axis represents a sound signature for a single type of background noise. For example, the refrigerator compressor would include its own sound signature 1104 and set of corresponding sound attributes. The dishwasher would also include its own sound signature 1102 and set of corresponding sound attributes. During a recording session, each set of sound attributes may be analyzed individually to determine which appliances are likely to be active at that time. If it is determined, based on the individual attributes, that both the dishwasher and the refrigerator compressor are likely to be operating, then the sound signature 1102 of the dishwasher and the sound signature 1104 of the refrigerator compressor can both be retrieved and used by a noise-cancellation algorithm. Some noise-cancelation algorithms may accept more than one background noise signature as a starting point, in which case both the sound signature 1102 and/or the sound signature 1104 can be provided to the noise-cancelation algorithm. In cases where the noise-cancelation algorithm accepts only a single background noise signature, the sound signature 1102 of the dishwasher and the sound signature 1104 of the refrigerator compressor can be combined to form a composite sound signature 1106 for both appliances. The manner in which two sound signatures can be combined will depend on the format of the stored sound signatures. For example, if the sound signatures comprise a set of frequency components, then the union of the frequency components of sound signatures 1102 and 1104 can be used as the composite sound signature. Sound signatures comprising a recording of the actual sound can be convolved together to form a composite sound, and so forth.

Chart 1100 illustrates how the composite sound signature 1106 is related to the source sound signatures 1102, 1104. In some embodiments, sound signatures may be combined and/or stored as needed. For example, if the dishwasher and the refrigerator compressor are determined to likely be active during a recording session, the composite sound signature 1106 can be generated and stored at that time and be made available for future use. In some embodiments, a memory structure similar to chart 1100 may be stored locally or remotely. This memory structure may pre-calculate combinations of individual sound signatures. This may allow combinations of sound signatures to be retrieved without needing to perform such a combination at the time the recording session is detected. Combining and generating, for example, a database of sound signature combinations may be performed locally at the smart-home device or remotely at the management server. For example, a local smart-home device may record sound signatures for 10 different appliances. These 10 sound signatures can be sent to the management server, where they are combined in various ways. The sound signature combinations can be transmitted back to smart device for future use. This may be advantageous in cases where the smart-home devices operate on a strict power budget and/or where they use relatively low-power microprocessors. In practice, each individual sound signature can be less than 1 kB size, so storing a database of sound combinations will typically fit on the memory of the local smart-home devices.

Although chart 1100 is illustrated as being two-dimensional in nature, other embodiments may include additional dimensions of sound combinations. For example, a smart-home device may determine that it is likely that three or more appliances are operating simultaneously. In this case, the smart-home device can determine a composite sound signature for the three or more sound signatures. As described above, this information can be pre-calculated or calculated on-the-fly as needed.

Figure 12:
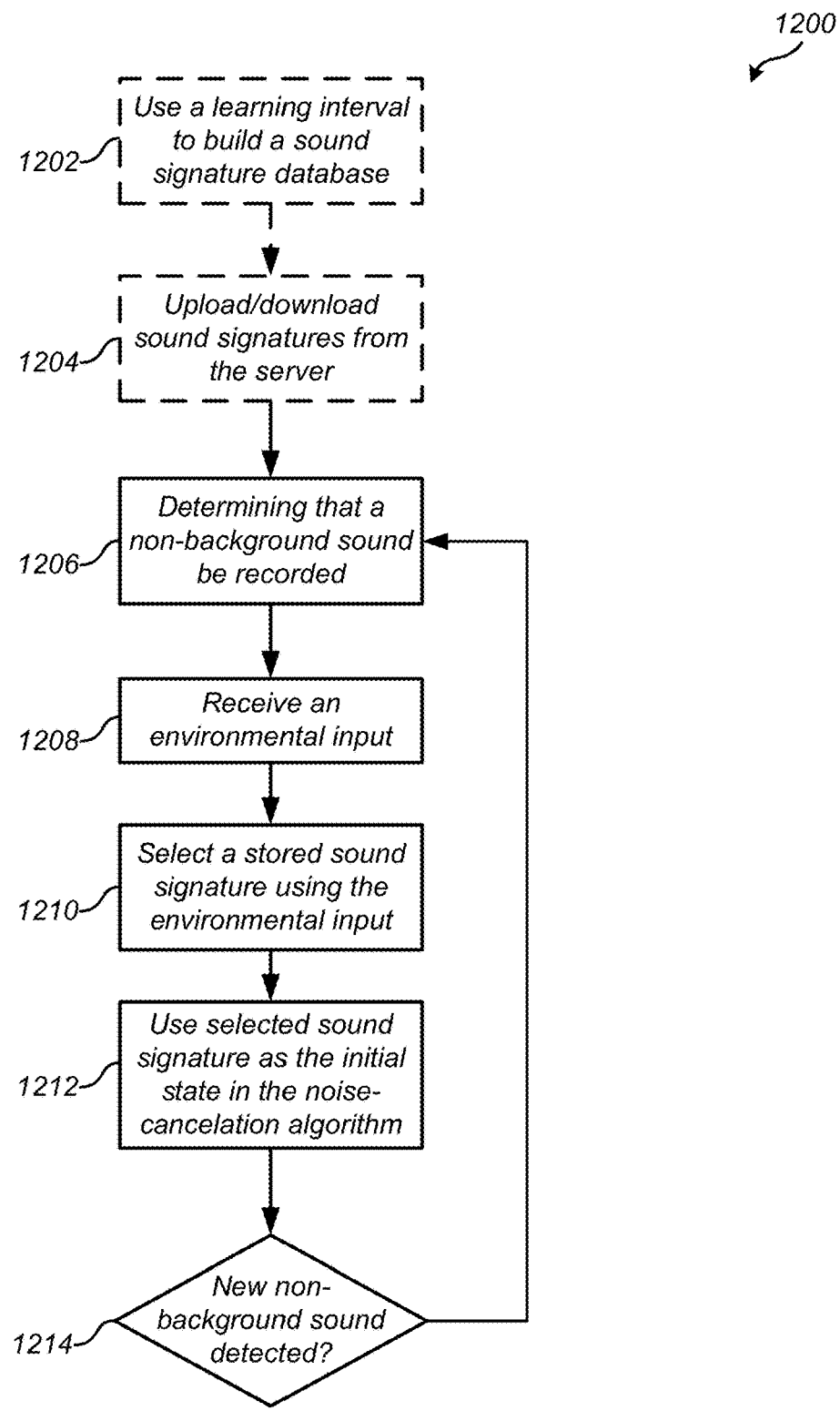
FIG. 12 illustrates a flowchart of a method for selecting a stored sound profile for a noise-reduction routine, according to some embodiments.

FIG. 12 illustrates a flowchart 1200 of a method for selecting a stored sound profile for a noise-reduction routine, according to some embodiments. The method may include using a learning interval to build up a database of sound signatures (1202), and/or sharing sound signatures between a local smart-home device and a remote management server (1204). These steps may be carried out as described above. Additionally, the learning interval may be used to associate sound signature attributes with each of the sound signatures to determine times when it is most likely that sound sources associated with each sound signature are active.

The method may also include determining that a non-background sound should be recorded (1206). In some embodiments, the non-background sound may correspond to a voice command. Such a voice command may be initiated by a key phrase, such as "Hello Nest." In other embodiments, the smart-home device can automatically begin recording each time it detects the sound of a human voice. A determination that a non-background sound should be recorded may also be made based on other types of user inputs. For example, a user may press a button on the smart-home device. A user may also perform a hand gesture that is detected by a motion sensor on the smart-home device. The smart-home device may also respond to environmental conditions that may start a recording session. For example, if a hazard detector detects a hazard condition, such as smoke, the hazard detector may begin listening for voice commands instructing hazard detector to call an emergency response team or indicating a false alarm situation. Smart-home device may also use occupancy sensors to begin recording when a user approaches the smart-home device as determined by the occupancy sensor. For example, a PIR sensor on a thermostat or hazard detector may indicate when a user is approaching the smart-home device, and the device may begin listening for voice commands.

The method may also include receiving an environmental input (1208). As described above, the environmental input may include any input or information that may be used to select existing sound signatures for sound sources that are likely to be active. The environmental input may include a time of day received from a local clock timer or from an internal processor clock, an indication of occupancy, a status indication from a local smart-home appliance, and/or the like. In some embodiments, the environmental input may also include a brief recording of sound prior to the beginning of the recording session. For example, as a user approaches the smart-home device, the occupancy sensor may indicate that the microphone should begin recording sound. For a few seconds before the user begins to speak, the microphone may record the sound of a dishwasher. This recording can then be compared to the local sound signatures, and the sound signature of the dishwasher can be used as the background noise signature for a noise cancellation algorithm that begins operating when the user start speaking Some embodiments may operate primarily according to a time-of-day schedule. In other embodiments, the environmental input may include a plurality of different inputs that are analyzed together in comparison to the sound attributes.

The method may further include selecting a stored sound signature using the environmental input (1210). The sound signature may be selected from the locally stored sound signatures or may be retrieved from a management server. The sound signature may be a composite of multiple individual sound signatures as described above. The sound signature may be selected based on a comparison between the attributes of the stored sound signatures and the environmental inputs. The environmental inputs can be compared to the attributes for each stored sound signature and a score can be generated for each sound signature. Each sound signature with the score above a predetermined threshold may be selected as a sound signature to be used in generating the background noise signature for the noise cancellation outer. For example, if the environmental inputs include a time of day and an occupancy indication, these may be compared to an occupancy attribute and a time of day schedule for each sound signature. It may be that a vacuum and a microwave oven are most likely to be used when the house is occupied at the current time, whereas the HVAC system in the refrigerator are more likely to be operating at a different time or according to a different occupancy pattern. The microwave and the vacuum can be assigned a score for each approximate match between a sound signature attribute and an environmental input. Scores may be weighted based on importance, e.g., matching the time of day attribute maybe twice as important as matching an occupancy attribute. A total score for each background noise signature may be generated and compared to a threshold. For example, if there is greater than a 50% match between attributes and environmental inputs, then the corresponding sound signature can be selected to be part of the background noise signature for the noise cancellation algorithm. This threshold may be adjusted dynamically over time as attributes for each sound signature are refined and feedback is received from the noise cancellation algorithm as described in greater detail below. If more than one sound signature is selected, then a composite signature can be generated/selected for use as the background noise signature. In embodiments where composite signatures have been pre-calculated, the environmental inputs can be compared to the attributes associated with the composite signature. Instead of selecting multiple individual sound signatures, these embodiments can select the sound signature with the highest score, be it an individual sound signature or a composite sound signature.

The method may additionally include using the selected sound signature as the initial state in the noise cancellation algorithm (1212). Many different noise cancellation algorithms may accept an initial background noise signature. Selecting/using one of these noise cancellation algorithms would be within the knowledge of one having ordinary skill in the art, and thus the operation of noise canceling algorithms is beyond the scope of this disclosure. As mentioned previously, the initial state provided to these noise-cancellation algorithms those in limited to the background noise recording taking place just prior to the operation of the noise cancellation algorithm. For example, when using a smart phone, the phone would previously begin recording background noise as the user enters/selects a telephone number. This recording itself would then be used as the starting state for the noise cancellation algorithm during the phone call. In contrast, the embodiments described herein receive environmental inputs to determine a background noise sound that is most likely to be occurring, and then use the environmental input to select among a plurality of pre-existing background noise signatures.

The method may also include repeating steps 1206 through 1212 for each non-background sound detected (1214). As each sound recording session ends, the smart-home device can generate diagnostic information for how well be selected background noise signature matched the actual background noise in the noise cancellation algorithm. For example, the smart-home device can determine a convergence interval length, i.e., a determination of how long it took the noise cancellation algorithm to converge from the starting point of the selected background noise signature. This information can be used to refine the selected sound signature as well as the accompanying attributes. For example, if a sound signature corresponding to a dishwasher was selected as the background noise signature, but it took more than a threshold amount of time for the noise cancellation algorithm to converge (e.g. 500 ms), then the sound attributes may be adjusted to lessen the likelihood that the dishwasher sound is selected during similar environmental conditions in the future. Additionally, it may be the case that the dishwasher was correctly selected, but that the sound signature is low quality. The sound signature for the dishwasher can be flagged, and better sound signatures can be recorded/generated during future learning intervals to replace the existing sound signature such that the noise cancellation algorithm will converge faster in the future.

Figure 13:
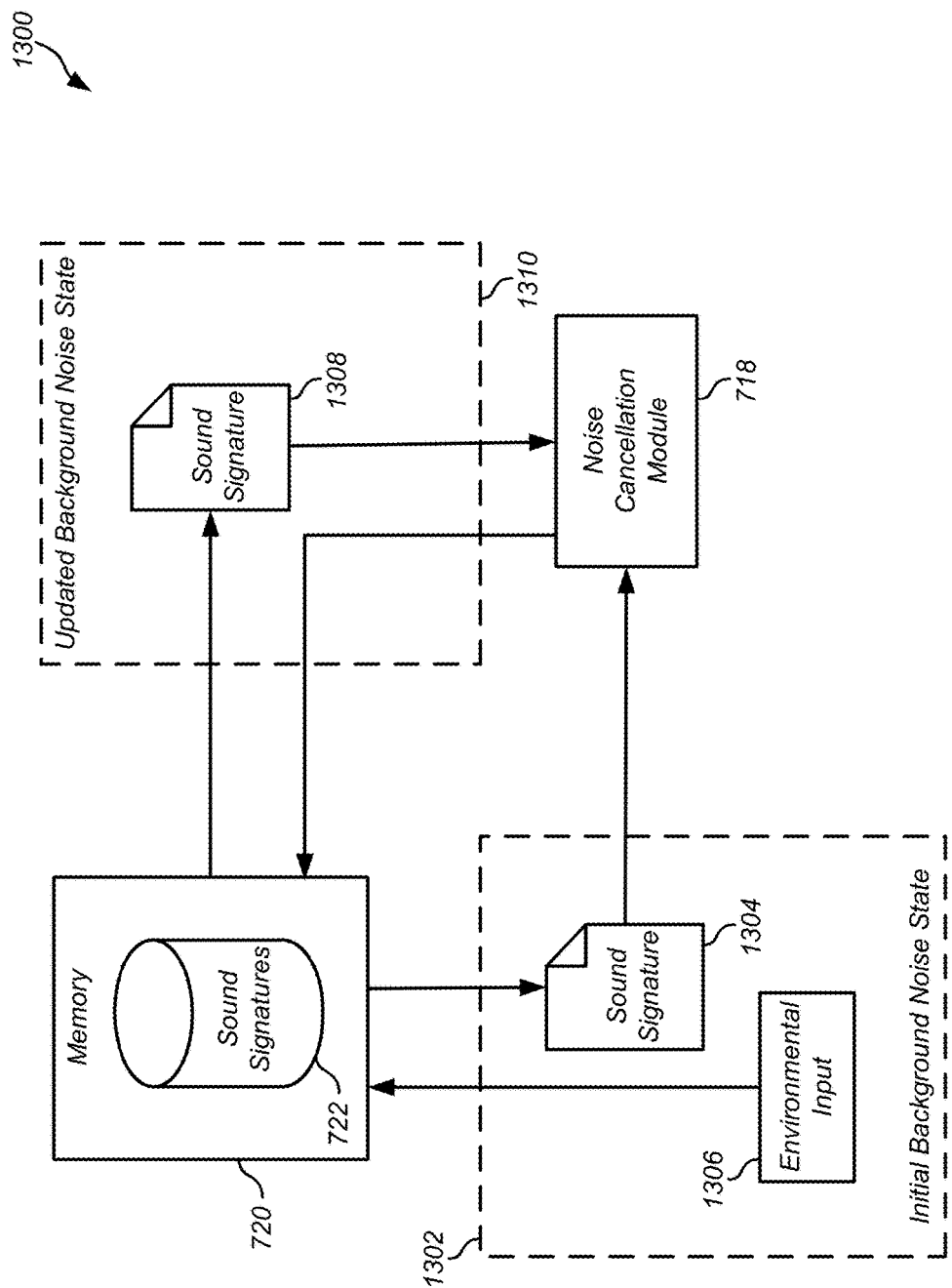
FIG. 13 illustrates a flow diagram of a converging noise-reduction routine, according to some embodiments.

FIG. 13 illustrates a flow diagram 1300 of a converging noise-reduction routine, according to some embodiments. Similar to the architecture described in FIG. 7, the smart-home device may include a noise cancellation module 718 and a memory 720. Near the beginning of a recording interval, an environmental input 1306 may be received and used to select a sound signature 1304 from a plurality of sound signatures 722. The selected sound signature 1304 may represent the initial background noise state 1302 for use by the noise cancellation module 718.

In some embodiments, additional environmental inputs may also be received in addition to the first environmental input 1306 used to select the initial background noise state 1302. For example, after the noise cancellation algorithm begins to filter noise from the recording interval, the smart-home device can continue receiving status inputs from smart appliances, recording ambient background noise in between words spoken by a user, and so forth. These initial inputs can be used to further characterize the types of sounds that are surrounding an intended voice recording. After the recording interval begins, a new smart home appliance may become active. These additional inputs can be received by the smart-home device and it may be determined that the initial background state 1302 needs to be updated.

Some embodiments may also receive feedback from the noise cancellation module 718 that indicates that the selected sound signature 1304 is not an accurate representation of the actual background noise recorded by the microphone of the smart-home device. Metrics may be received that indicate an approximate time for convergence of the noise cancellation algorithm. If the estimated convergence time is more than a predetermined threshold (e.g., 500 ms, one second, 1500 ms, etc.), then the noise cancellation module 718 may be provided a new background noise signature such that it can converge faster.

The noise cancellation module 718 can generate feedback and/or additional environmental inputs that can be used to select a new sound signature 1308 from the memory 720 to be used as the updated background noise state 1310. Some embodiments may analyze the convergence of the noise cancellation algorithms periodically (e.g. everyone 100 ms, every 500 ms, etc.) and select a new sound signature 1308 such that the convergence of the noise cancellation algorithm can be accelerated. Typically, a new background noise signature that more accurately represents the true background noise will cause the noise cancellation algorithm to converge faster than it would to continue letting the noise cancellation algorithm converge using a less accurate initial background noise signature.

Figure 14:
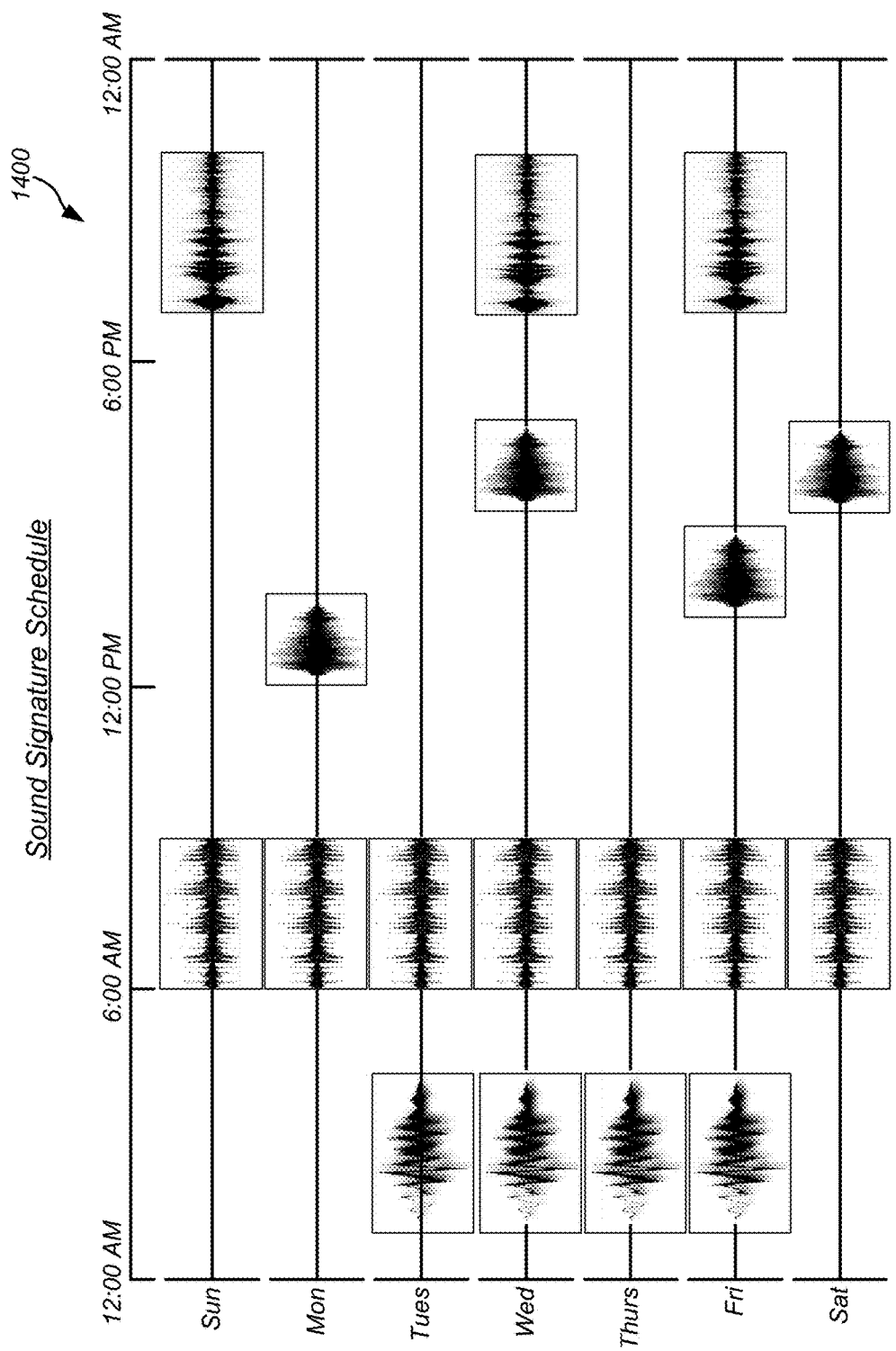
FIG. 14 illustrates a timeline of stored sound profiles, according to some embodiments.

FIG. 14 illustrates a timeline 1400 of stored sound profiles, according to some embodiments. Some embodiments may construct a sound signature schedule that can be used as at least an initial means for selecting possible sound signatures to use as the background noise signature. Timeline 1400 illustrates how such a sound signature schedule may be represented for a 24 hour period for one week intervals. Each week, actual environmental inputs that indicate when certain sound signatures are present in the surrounding environment can be used to update the sound signature schedule.

Once the sound signature schedule is established, the smart-home device can use the sound signature schedule as a starting point for selecting an initial background signature during a recording interval. For example, every day at 6:00 AM a smart thermostat may turn on the HVAC system for the home. The sound signature schedule includes an entry for a sound signature corresponding to the HVAC system every day at 6:00 AM for at least the one hour interval. If the recording interval occurs during this time, the smart-home device can check the sound signature schedule and quickly determine that the sound signature corresponding to the HVAC system should very likely be selected as at least one of the components of the background noise signature. This can eliminate needing to test other environmental inputs against attributes of the HVAC the system sound signature, and the smart-home device can instead test environmental inputs against the attributes of other sound signatures to determine if any other appliances or noise sources may be active in addition to the HVAC system.

Some embodiments may establish a schedule similar to timeline 1400 using different environmental inputs. For example, a probability mapping can be established for an occupancy sensor in relation to existing sound signatures. The probability mapping can, for each sound signature, indicate whether the sound signature is correlated with, not correlated with, or independent of, an occupancy indication. Other environmental inputs may also have their correlation with sound signatures similarly pre-calculated for efficient lookup when determining a background noise signature.

Figure 15:
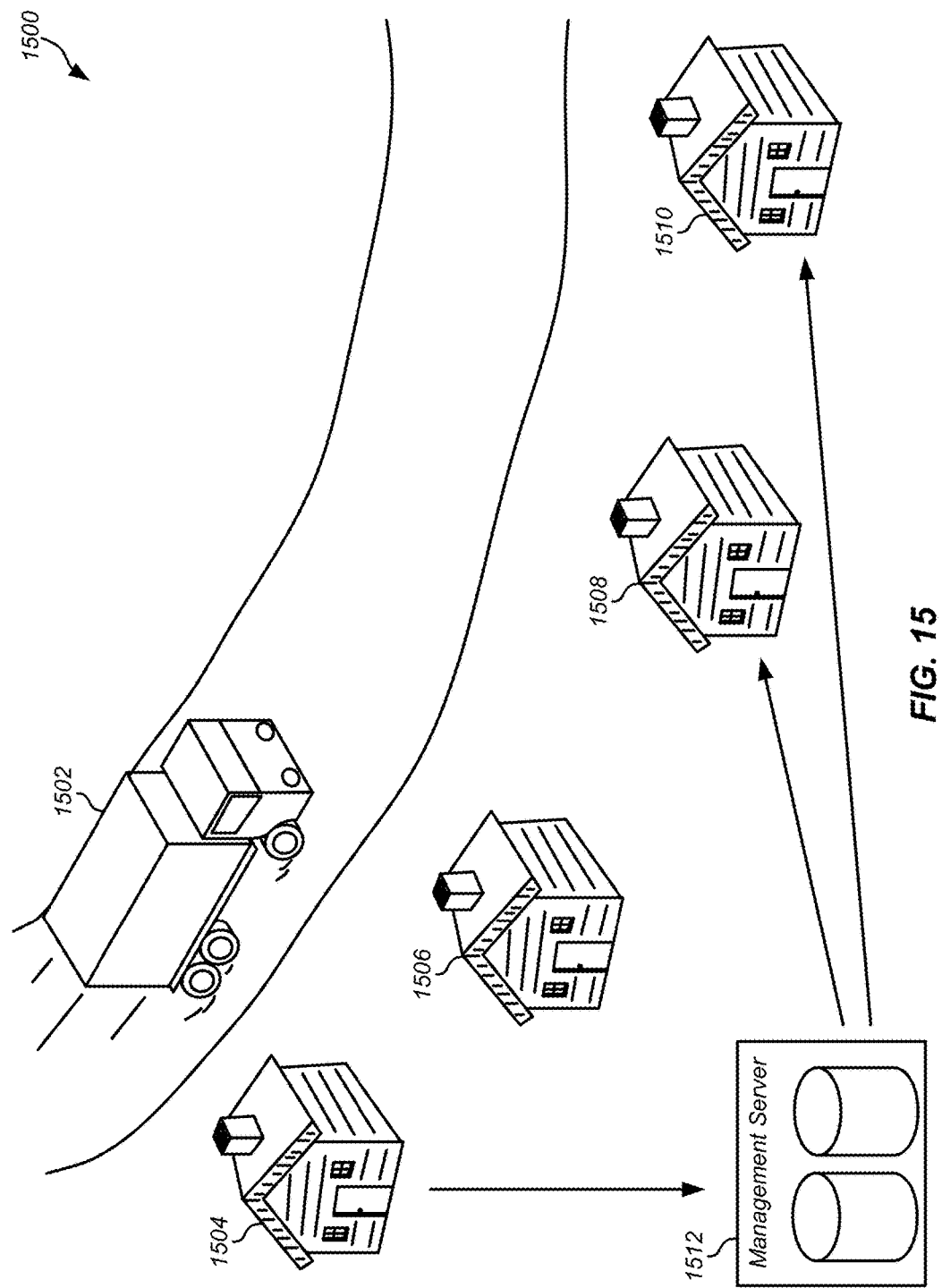
FIG. 15 illustrates a scenario for communication of sound profiles between homes, according to some embodiments.

FIG. 15 illustrates a scenario 1500 for communication of sound profiles between homes, according to some embodiments. Occasionally, certain background noise sounds may occur on a very infrequent or one-time basis. For example, construction noise, loud traffic (e.g. a snowplow or tractor-trailer), aircraft noise, and/or the like may be occurring in a neighborhood. In the example of FIG. 15, a loud truck 1502 may be traveling down a road adjacent to a plurality of different homes 1504, 1506, 1508, 1510. Because the noise of the truck 1502 may not have been previously recorded by any smart-home device in any of the homes 1504, 1506, 1508, 1510, the sound would not be available as a pre-stored sound signature for use as an initial background noise signature in any of the individual homes.

However, if smart-home devices in any of the homes are connected to a central management server 1512, this network capability may be leveraged such that one smart-home device can send a sound signature to additional homes 1508, 1510 for use in noise canceling algorithms. As a sound source moves through a neighborhood, a first home 1504 can detect, record, and/or analyze the sound to generate a sound signature. The sound signature can be transmitted to the management server 1512. The management server 1512 can then transmit the sound signature to surrounding homes 1508, 1510 along with an indication that the sound source is nearby. If a recording interval is initiated in the surrounding homes 1508, 1510, then the indication that the sound source is nearby can be used as an environmental input to select the sound signature transmitted from the management server 1512 for use in the noise cancellation algorithms.

For example, as the truck 1502 moves through the neighborhood, the sound of the truck may be recorded by the first home 1504, and the first home may generate a corresponding sound signature that is transmitted to the management server 1512. The management server 1512 can then determine if there are any nearby homes 1508, 1510 that may be also be in range of the path of the truck 1502. The management server 1512 may use Internet mapping services to determine which homes with registered smart-home device networks may be in the path of the truck 1502. The management server 1512 can then transmit the sound signature provided by the first home 1504 to the surrounding homes 1508, 1510. In some embodiments, the management server 1512 may also identify homes 1506 that, although within the immediate vicinity of the first home 1504, would likely not receive the sound signature from the management server 1512 in time to use the sound signature as an initial background noise signature in a noise cancellation algorithm. If a smart-home device in home 1510 begins receive a voice command from a user as the truck 1502 passes by the home 1510, the smart-home device can then utilize the received sound signature of the truck 1502 recorded by the first house 1504 and immediately begin filtering the noise of the truck 1502 from the recording.

Figure 16:
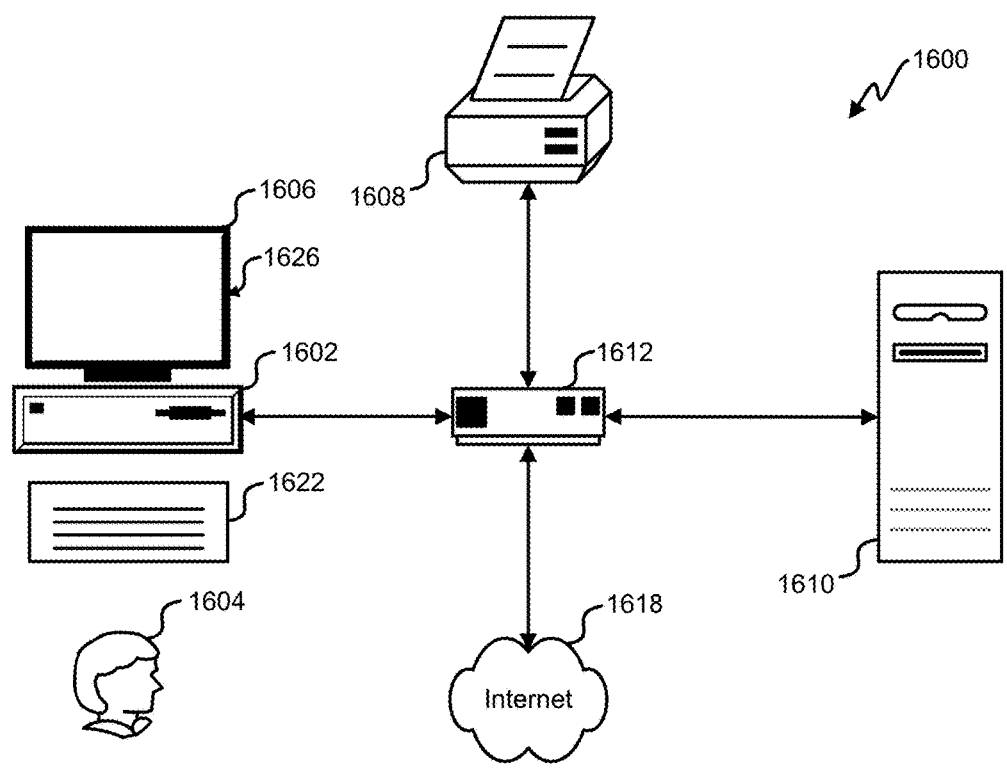
FIG. 16 illustrates a block diagram of an embodiment of a computer system, according to some embodiments.

Referring next to FIG. 16, an exemplary environment with which embodiments may be implemented is shown with a computer system 1600 that can be used by a user 1604 to remotely control, for example, one or more of the sensor-equipped smart-home devices according to one or more of the embodiments. The computer system 1610 can alternatively be used for carrying out one or more of the server-based processing paradigms described hereinabove or as a processing device in a larger distributed virtualized computing scheme for carrying out the described processing paradigms, or for any of a variety of other purposes consistent with the present teachings. The computer system 1600 can include a computer 1602, keyboard 1622, a network router 1612, a printer 1608, and a monitor 1606. The monitor 1606, processor 1602 and keyboard 1622 are part of a computer system 1626, which can be a laptop computer, desktop computer, handheld computer, mainframe computer, etc. The monitor 1606 can be a CRT, flat screen, etc.

A user 1604 can input commands into the computer 1602 using various input devices, such as a mouse, keyboard 1622, track ball, touch screen, etc. If the computer system 1600 comprises a mainframe, a designer 1604 can access the computer 1602 using, for example, a terminal or terminal interface. Additionally, the computer system 1626 may be connected to a printer 1608 and a server 1610 using a network router 1612, which may connect to the Internet 1618 or a WAN.

The server 1610 may, for example, be used to store additional software programs and data. In one embodiment, software implementing the systems and methods described herein can be stored on a storage medium in the server 1610. Thus, the software can be run from the storage medium in the server 1610. In another embodiment, software implementing the systems and methods described herein can be stored on a storage medium in the computer 1602. Thus, the software can be run from the storage medium in the computer system 1626. Therefore, in this embodiment, the software can be used whether or not computer 1602 is connected to network router 1612. Printer 1608 may be connected directly to computer 1602, in which case, the computer system 1626 can print whether or not it is connected to network router 1612.

Figure 17:
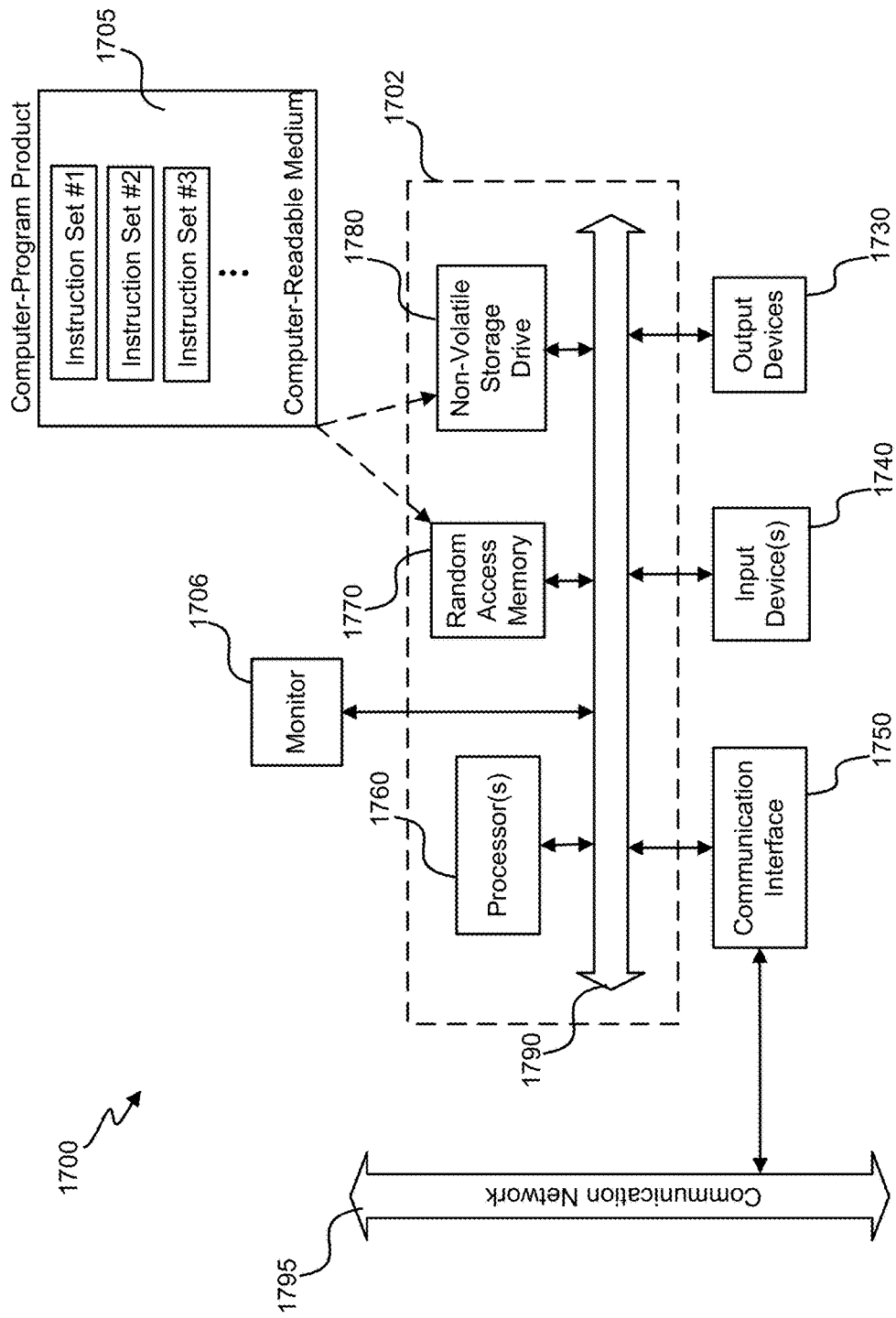
FIG. 17 illustrates a block diagram of an embodiment of a special-purpose computer, according to some embodiments.

With reference to FIG. 17, an embodiment of a special-purpose computer system 1700 is shown. For example, one or more intelligent components, processing engine 206 and components thereof may be a special-purpose computer system 1700. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1726, it is transformed into the special-purpose computer system 1700.

Special-purpose computer system 1700 comprises a computer 1702, a monitor 1706 coupled to computer 1702, one or more additional user output devices 1730 (optional) coupled to computer 1702, one or more user input devices 1740 (e.g., keyboard, mouse, track ball, touch screen) coupled to computer 1702, an optional communications interface 1750 coupled to computer 1702, a computer-program product 1705 stored in a tangible computer-readable memory in computer 1702. Computer-program product 1705 directs system 1700 to perform the above-described methods. Computer 1702 may include one or more processors 1760 that communicate with a number of peripheral devices via a bus subsystem 1790. These peripheral devices may include user output device(s) 1730, user input device(s) 1740, communications interface 1750, and a storage subsystem, such as random access memory (RAM) 1770 and non-volatile storage drive 1780 (e.g., disk drive, optical drive, solid state drive), which are forms of tangible computer-readable memory.

Computer-program product 1705 may be stored in non-volatile storage drive 1780 or another computer-readable medium accessible to computer 1702 and loaded into memory 1770. Each processor 1760 may comprise a microprocessor, such as a microprocessor from Intel® or Advanced Micro Devices, Inc.®, or the like. To support computer-program product 1705, the computer 1702 runs an operating system that handles the communications of product 1705 with the above-noted components, as well as the communications between the above-noted components in support of the computer-program product 1705. Exemplary operating systems include Windows® or the like from Microsoft Corporation, Solaris® from Sun Microsystems, LINUX, UNIX, and the like.

User input devices 1740 include all possible types of devices and mechanisms to input information to computer system 1702. These may include a keyboard, a keypad, a mouse, a scanner, a digital drawing pad, a touch screen incorporated into the display, audio input devices such as voice recognition systems, microphones, and other types of input devices. In various embodiments, user input devices 1740 are typically embodied as a computer mouse, a trackball, a track pad, a joystick, wireless remote, a drawing tablet, a voice command system. User input devices 1740 typically allow a user to select objects, icons, text and the like that appear on the monitor 1706 via a command such as a click of a button or the like. User output devices 1730 include all possible types of devices and mechanisms to output information from computer 1702. These may include a display (e.g., monitor 1706), printers, non-visual displays such as audio output devices, etc.

Communications interface 1750 provides an interface to other communication networks and devices and may serve as an interface to receive data from and transmit data to other systems, WANs and/or the Internet 1618. Embodiments of communications interface 1750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1750 may be coupled to a computer network, to a FireWire® bus, or the like. In other embodiments, communications interface 1750 may be physically integrated on the motherboard of computer 1602, and/or may be a software program, or the like.

RAM 1770 and non-volatile storage drive 1780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1770 and non-volatile storage drive 1780 may be configured to store the basic programming and data constructs that provide the functionality of various embodiments of the present invention, as described above.

Software instruction sets that provide the functionality of the present invention may be stored in RAM 1770 and non-volatile storage drive 1780. These instruction sets or code may be executed by the processor(s) 1760. RAM 1770 and non-volatile storage drive 1780 may also provide a repository to store data and data structures used in accordance with the present invention. RAM 1770 and non-volatile storage drive 1780 may include a number of memories including a main random access memory (RAM) to store instructions and data during program execution and a read-only memory (ROM) in which fixed instructions are stored. RAM 1770 and non-volatile storage drive 1780 may include a file storage subsystem providing persistent (non-volatile) storage of program and/or data files. RAM 1770 and non-volatile storage drive 1780 may also include removable storage systems, such as removable flash memory.

Bus subsystem 1790 provides a mechanism to allow the various components and subsystems of computer 1702 to communicate with each other as intended. Although bus subsystem 1790 is shown schematically as a single bus, alternative embodiments of the bus subsystem may utilize multiple busses or communication paths within the computer 1702.

What is claimed is:

1. A smart-home device comprising:
   a recording device configured to record sound during a first time interval;
   a memory device comprising a plurality of stored sound profiles;
   a processing system configured to:
      receive a communication transmitted from a household appliance indicating that the household appliance is operating;
      in response to receiving the communication transmitted from the household appliance, select a stored sound profile from the plurality of stored sound profiles based on a sound made by the household appliance while the household appliance is operating; and
      perform a noise-cancellation routine on the sound recorded during the first time interval, wherein the stored sound profile is used as an initial background noise profile for the noise-cancelation routine.

2. The smart-home device of claim 1 wherein the smart-home device comprises a hazard detector, the hazard detector comprising:
   a smoke detector; and
   a carbon monoxide detector.

3. The smart-home device of claim 1 wherein the smart-home device comprises a thermostat, the thermostat comprising:
   a temperature sensor; and
   a motion sensor.

4. The smart-home device of claim 1, further comprising a network interface in communication with a remote server.

5. The smart-home device of claim 4, wherein the processing system is further configured to:
   receive an environmental input;
   send the environmental input to the remote server through the network interface;
   receive a second stored sound profile through the network interface from the remote server, wherein the remote server selected the second stored sound profile based on the environmental input; and
   perform the noise-cancellation routine on sound recorded during a second time interval, wherein the second stored sound profile is used as an initial background noise profile for the noise-cancellation routine.

6. The smart-home device of claim 4, wherein the processing system is further configured to:
   record a new sound profile using a microphone; and
   send the new sound profile to the remote server through the network interface.

7. The smart-home device of claim 4, wherein:
   the smart-home device is in communication through the network interface with the household appliance within a same home; and
   the communication is received from the household appliance through the network interface.

8. The smart-home device of claim 1, wherein the stored sound profile is recorded by a second smart-home device within the same home and transmitted from the second smart-home device to the smart-home device.

9. A method of selecting an initial background noise for a noise-cancelation routine in a smart-home device, the method comprising:
   receiving, by the smart-home device, a communication from a household appliance indicating that the household appliance is operating;
   selecting, using a processor on the smart-home device, and in response to receiving the communication from the household appliance, a stored sound profile from a plurality of stored sound profiles, wherein the stored sound profile is selected based on a sound made by the household appliance while the household appliance is operating; and
   performing the noise-cancelation routine on sound received through a microphone of the smart-home device, wherein the noise-cancelation routine is performed using the stored sound profile as an initial background noise for the noise-cancelation routine.

10. The method of claim 9, wherein the sound received through the microphone of the smart-home device has a duration of less than 10 seconds.

11. The method of claim 9, wherein the noise-cancellation routine uses the initial background noise as a starting point for a convergence algorithm.

12. The method of claim 11, further comprising:
    determining that a second stored sound profile will cause the convergence algorithm to converge faster than the stored sound profile; and
    providing the second stored sound profile to the noise-cancellation routine.

13. The method of claim 9, further comprising, during a learning interval, building the plurality of stored sound profiles by:
    detecting a time interval during which a steady-state background noise is present;
    recording the steady-state background noise; and
    recording characteristics of the occurrence of the steady-state background noise.

14. A non-transitory memory device comprising instructions that, when executed by one or more processors, cause the one or more processors to perform operations comprising:
    receiving, by the one or more processors, a communication transmitted from a household appliance indicating that the household appliance is operating;
    selecting, using the one or more processors, and in response to receiving the communication transmitted from the household appliance, a stored sound profile from a plurality of stored sound profiles, wherein the stored sound profile is selected based on a sound made by the household appliance while the household appliance is operating; and
    performing a noise-cancelation routine on a received sound, wherein the noise-cancelation routine is performed using the stored sound profile as an initial background noise for the noise-cancelation routine.

15. The non-transitory memory device of claim 14, wherein the stored sound profile is associated with sound emitted by a household appliance during operation.

16. The non-transitory memory device of claim 14, wherein the received sound comprises a voice command.

17. The non-transitory memory device of claim 14, wherein the noise-cancelation routine is performed on the received sound in real-time.

* * * * *